(12) United States Patent
Iwamoto et al.

(10) Patent No.: US 11,509,243 B2
(45) Date of Patent: Nov. 22, 2022

(54) MOVING BODY, STATION, MOVEMENT SYSTEM, MOVING METHOD, AND PROGRAM

(71) Applicant: TOYOTA JIDOSHA KABUSHIKI KAISHA, Toyota (JP)

(72) Inventors: Kunihiro Iwamoto, Nagakute (JP); Yuta Itozawa, Nagoya (JP); Hirotaka Komura, Anjyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 16/951,482

(22) Filed: Nov. 18, 2020

(65) Prior Publication Data

US 2021/0194388 A1    Jun. 24, 2021

(30) Foreign Application Priority Data

Dec. 23, 2019  (JP) .............................. JP2019-231858

(51) Int. Cl.
*H02N 2/10* (2006.01)
*H02N 2/02* (2006.01)

(52) U.S. Cl.
CPC ............. *H02N 2/101* (2013.01); *H02N 2/025* (2013.01)

(58) Field of Classification Search
CPC .......... H02N 2/101; H02N 2/025; B66F 3/08; B66F 9/063; B66F 13/005; B66B 1/06; B65G 1/0492; B62D 63/02; B62D 63/04; B25J 9/0009; B25J 9/104; B25J 9/1602; B25J 9/1669; B25J 9/1679; B25J 5/007; B25J 18/02
See application file for complete search history.

(56) References Cited

U.S. PATENT DOCUMENTS

| | | | |
|---|---|---|---|
| 9,758,980 B2 | 9/2017 | Ben Don et al. | |
| 9,952,589 B1 | 4/2018 | Brazeau | |
| 10,023,434 B2 | 7/2018 | Brady et al. | |
| 2014/0014470 A1* | 1/2014 | Razumov | B65G 1/0492 198/465.1 |
| 2018/0282064 A1* | 10/2018 | Buzan | B65G 1/1373 |
| 2019/0329826 A1* | 10/2019 | Tang | B62D 21/02 |

FOREIGN PATENT DOCUMENTS

| | | |
|---|---|---|
| JP | 2002-285707 A | 10/2002 |
| JP | 2007192257 A | 8/2007 |
| WO | 2014/009797 A1 | 1/2014 |

* cited by examiner

*Primary Examiner* — Emily P Pham
(74) *Attorney, Agent, or Firm* — Oliff PLC

(57) ABSTRACT

To make it possible to freely move a moving body between level surfaces located at different heights that are not connected by a vertical member. A moving body includes a movable moving part, an expansion/contraction part disposed in the moving part and configured to expand and contract in a vertical direction, a first engagement part disposed at a tip of the expansion/contraction part and configured to engage with a member located in a surrounding environment, and a control unit configured to control the moving part and the expansion/contraction part. The control unit moves the moving part to a target height position by engaging the first engagement part with a member located at the target height position and then expanding or contracting the expansion/contraction part.

11 Claims, 28 Drawing Sheets

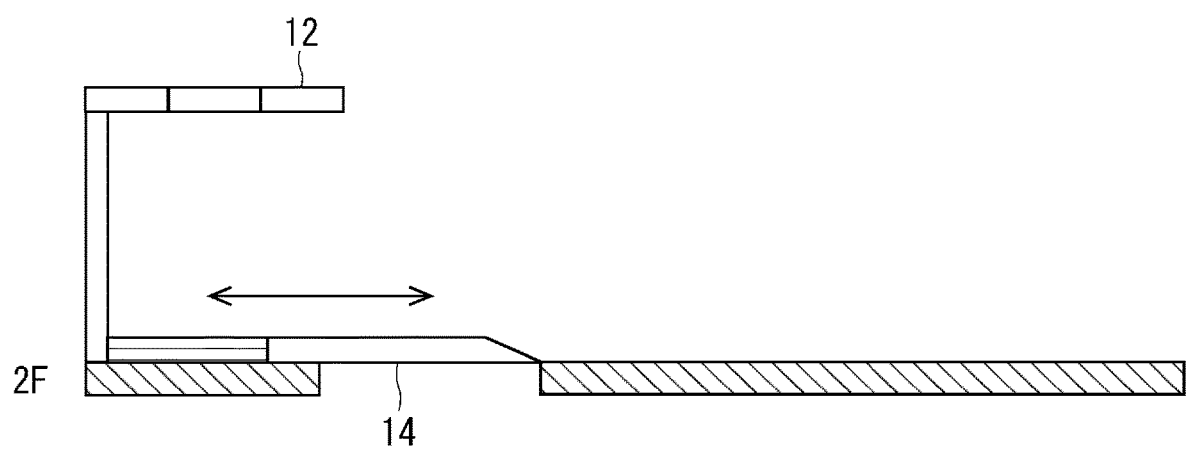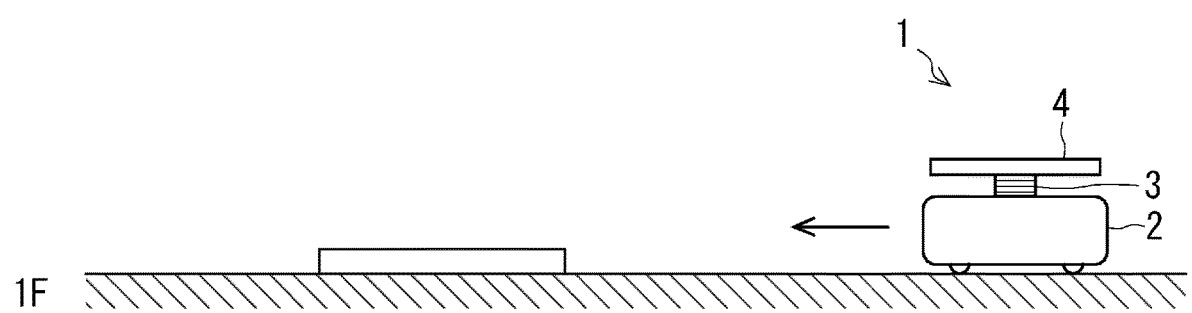
Fig. 8

MOVING BODY, STATION, MOVEMENT SYSTEM, MOVING METHOD, AND PROGRAM

CROSS REFERENCE TO RELATED APPLICATIONS

This application is based upon and claims the benefit of priority from Japanese patent application No. 2019-231858, filed on Dec. 23, 2019, the disclosure of which is incorporated herein in its entirety by reference.

BACKGROUND

The present disclosure relates to a moving body, a station, a movement system, and a moving method.

A moving body equipped with a grasping mechanism for grasping a vertical member that vertically extends and connects level surfaces located at different heights, such as a lifting/lowering pole, is known (see, e.g., U.S. Pat. No. 9,952,589). The moving body moves up and down along the lifting/lowering pole by vertically driving the grasping mechanism, and thereby moves between different level surfaces.

SUMMARY

However, the above-described moving body can move only between level surfaces that are connected by a vertical member. Therefore, there is a restriction that the moving body cannot move to a detached level surface that is not connected by the vertical member.

The present disclosure has been made in order to solve the above-described problem and one of its main objects is to provide a moving body capable of freely moving between level surfaces located at different heights that are not connected by a vertical member, and provides a station, a movement system, and a moving method capable of freely moving such a moving body between such level surfaces.

To achieve the above-described object, a first exemplary aspect is a moving body including:
  a movable moving part;
  an expansion/contraction part disposed in the moving part and configured to expand and contract in a vertical direction;
  a first engagement part disposed at a tip of the expansion/contraction part and configured to engage with a member located in a surrounding environment; and
  a control unit configured to control the moving part and the expansion/contraction part, in which
  the control unit moves the moving part to a target height position by engaging the first engagement part with a member located at the target height position and then expanding or contracting the expansion/contraction part.

In an aspect, the moving body may further include a fixing part configured to fix the moving part when the expansion/contraction part is expanded or contracted.

In an aspect, when the control unit determines that the first engagement part has engaged with the member located at the target height position, the control unit may perform control so as to move the moving part to the target height position by expanding or contracting the expansion/contraction part.

In an aspect, the expansion/contraction part may include a first belt including a first engagement mechanism and a second belt including a second engagement mechanism capable of engaging with and being disengaged from the first engagement mechanism, and the expansion/contraction part may form a columnar structure by spirally winding the first and second engagement mechanisms of the first and second belts around one and the same axis in a mutually overlapping state.

To achieve the above-described object, another exemplary aspect is a station including:
  at least one second engagement part configured to engage with the first engagement part of the moving body; and
  at least one opening/closing floor disposed below the second engagement part and configured to open or close a through hole formed in a floor surface, the through hole being formed to enable the moving body to pass through the floor surface when the moving body moves up or down.

To achieve the above-described object, another exemplary aspect is a movement system including the station and the moving body configured to move up and down in the station.

In an aspect, the movement system may further include an object detection unit configured to detect an object located at a predetermined position below the through hole, and the control unit may move the moving part to the predetermined position and expand the expansion/contraction part when the object detection unit does not detect any object.

In an aspect, the control unit may perform control so as to expand or contract the expansion/contraction part, to thereby engage the first engagement part with the second engagement part located at the target height position.

In an aspect, the control unit may perform control so as to, after engaging the first engagement part with the second engagement part, move the moving part to the target height position through the through hole by expanding or contracting the expansion/contraction part, close the opening/closing floor, and lower the moving part onto the opening/closing floor.

To achieve the above-described object, another exemplary aspect may be a method for moving a moving body,
  the moving body including:
  a movable moving part;
  an expansion/contraction part disposed in the moving part and configured to expand and contract in a vertical direction; and
  a first engagement part disposed at a tip of the expansion/contraction part and configured to engage with a member located in a surrounding environment,
  the method including:
  moving the moving part to a target height position by engaging the first engagement part with a member located at the target height position and then expanding or contracting the expansion/contraction part.

According to the present disclosure, it is possible to provide a moving body capable of freely moving between level surfaces located at different heights that are not connected by a vertical member, and provides a station, a movement system, and a moving method capable of freely moving such a moving body between such level surfaces.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 8 shows a diagram for explaining an example of a method for moving a moving body from a first-floor surface to a second-floor surface;

DESCRIPTION OF EMBODIMENTS

First Embodiment

Figure 1:
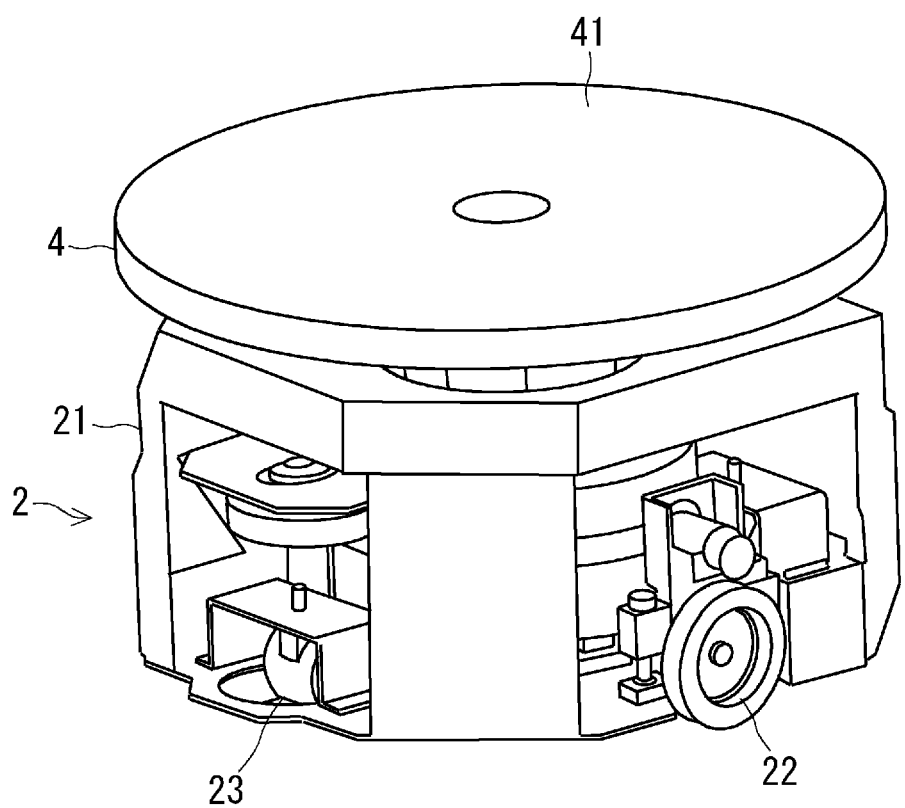
FIG. 1 is a perspective view showing a schematic configuration of a mobile body according to an embodiment.
Figure 2:
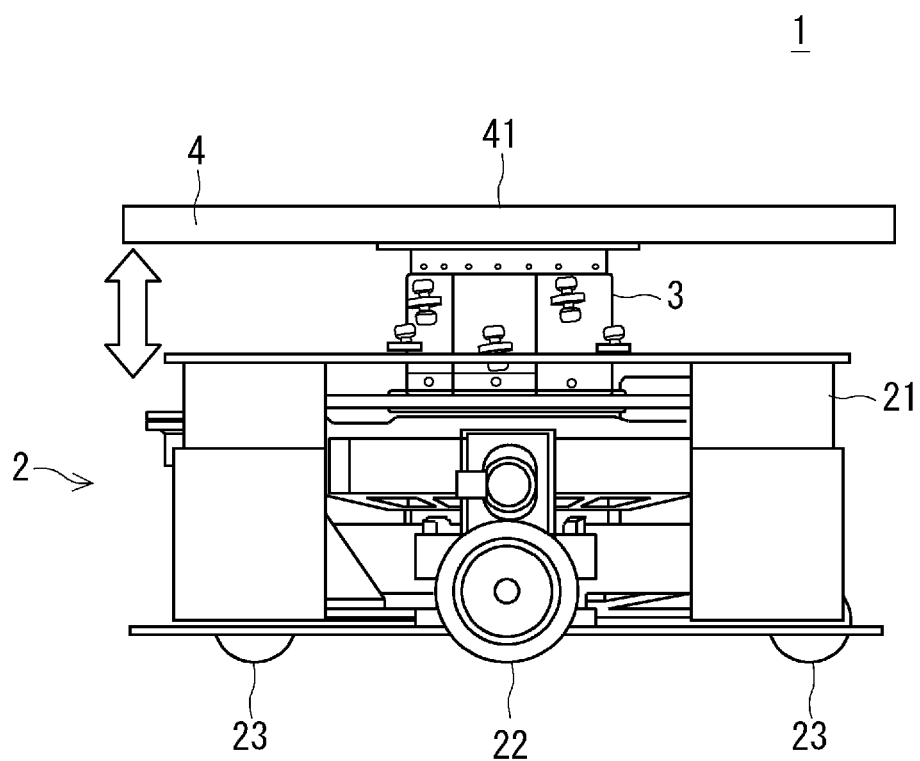
FIG. 2 is a side view showing a schematic configuration of the mobile body according to the embodiment.
Figure 3:
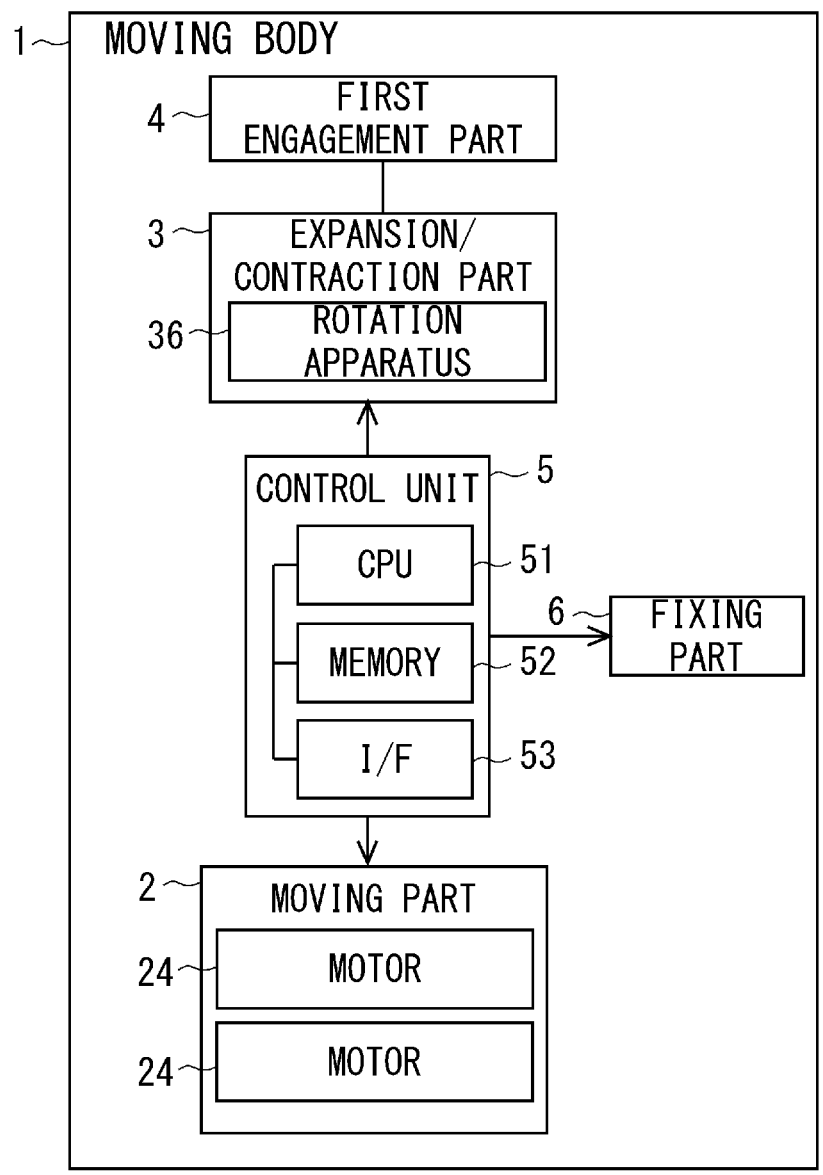
FIG. 3 is a block diagram showing a schematic system configuration of the mobile body according to the embodiment.

Embodiments according to the present disclosure will be described hereinafter with reference to the drawings. FIG. 1 is a perspective view showing a schematic configuration of a moving body according to this embodiment. FIG. 2 is a side view showing a schematic configuration of the mobile body according to this embodiment. FIG. 3 is a block diagram showing a schematic system configuration of the mobile body according to this embodiment.

A moving body 1 according to this embodiment can move between floor surfaces located at different heights in a moving environment such as a house, a facility, a warehouse, and a factory. The moving body 1 according to this embodiment includes a movable moving part 2, an expansion/contraction part 3 that expands and contracts in the vertical direction, a first engagement part 4 that engages with a member located in a surrounding environment, and a control unit 5 that controls the moving part 2 and the expansion/contraction part 3.

The moving part 2 includes a moving body main body 21, a pair of left and right driving wheels 22 and a pair of front and rear driven wheels 23, all of which are rotatably mounted in the moving body main body 21, and a pair of motors 24 that rotationally drive the respective driving wheels 22. Each of the motors 24 rotates a respective one of the driving wheels 22 through a speed reducer or the like. Each of the motors 24 can rotate a respective one of the driving wheels 22 according to a control signal provided from the control unit 5, so that the moving body main body 21 can be moved to an arbitrary position. Note that the above-described configuration of the moving part 2 is merely an example and is not limited to this example. For example, the number of the driving wheels 22 of the moving part 2 and that of the driven wheels 23 thereof may be arbitrarily determined. That is, any configuration may be applied as long as the moving body main body 21 can be moved to an arbitrary position.

Figure 4:
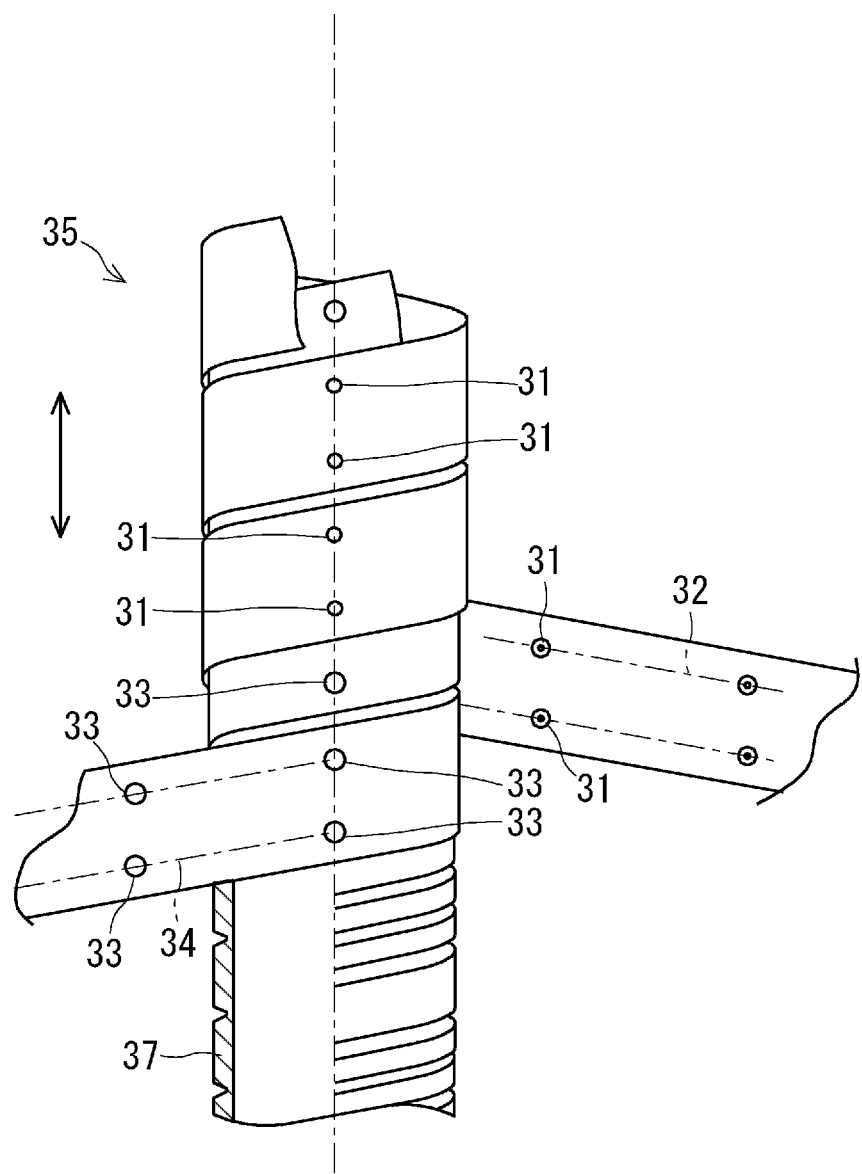
FIG. 4 shows an example of a columnar structure.

The expansion/contraction part 3 may be configured as a telescopic type expanding/contracting mechanism that expands and contracts in the vertical direction. FIG. 4 shows an example of a columnar structure of the expansion/contraction part 3 (which will be described later). For example, the expansion/contraction part 3 includes a first belt 32 including a first engagement mechanism 31, a second belt 34 including a second engagement mechanism 33 capable of engaging with and being disengaged from the first engagement mechanism 31, and a rotation apparatus 36 that rotates a columnar structure 35. The first and second belts 34 are made of a rigid material such as a metal plate or a hard synthetic resin plate, and have appropriate flexibility and elasticity.

As shown in FIG. 4, the expansion/contraction part 3 forms the columnar structure 35 by spirally winding the first and second engagement mechanisms 31 and 33 of the first and second belts 32 and 34 around one and the same axis in a mutually overlapping state. For example, in the columnar structure 35, the first belt 32 is wound on the outer side of the second belt 34. Specifically, a part on the upper-edge side of the first belt 32 overlaps (i.e., is placed over) a part on the lower-edge side of the second belt 34 that is disposed vertically above the first belt 32 from the outer side thereof, and a part on the upper-edge side of this second belt 34 overlaps (i.e., is placed under) a part on the lower-edge side of the first belt 32 that is disposed vertically above the second belt 34 from the inner side thereof. That is, the first and second belts 32 and 34, each of which is spirally wound, partially overlap each other in the axial direction in an alternative manner so that the columnar structure 35 is formed.

The first and second engagement mechanisms 31 and 33 of the first and second belts 32 and 34 overlap each other. The first and second engagement mechanisms 31 and 33 are formed by, for example, an engagement pin and an engagement hole, and engage with each other. Since the overlapped parts of the surfaces of the first and second belts 32 and 34 are fixed to each other by the engagement of the first and second engagement mechanisms 31 and 33, the columnar structure 35 has high rigidity close to that of an integrally-formed columnar member.

The rotation apparatus 36 includes a rotating mechanism for rotating the columnar structure 35 about the axis, a motor that drives the rotating mechanism, and so on.

By rotating the columnar structure 35, the rotation apparatus 36 winds up the housed first and second belts 32 and 34 along grooves or the like formed in a guide part 37, and spirally winds the first and second belts 32 and 34 around one and the same axis in a mutually overlapping state. By this spiral winding, the columnar structure 35 can be expanded in the axial direction. As described above, by winding the first and second belts 32 and 34, the columnar structure 35 can be expanded in the axial direction while maintaining high rigidity thereof.

Further, by rotating the columnar structure 35 in the reverse direction, the rotation apparatus 36 rewinds the first and second belts 32 and 34 along grooves or the like formed in the guide part 37 and thereby separates them from the columnar structure 35, so that the columnar structure 35 can be contracted in the axial direction. As described above, by rewinding the first and second belts 32 and 34, the columnar structure 35 can be contracted (i.e., can be shorten) in the axial direction while housing the first and second belts 32 and 34 in a small space.

Note that details of the above-described columnar structure 35 are disclosed in, for example, Japanese Unexamined Patent Application Publication No. 2007-192257, which is incorporated herein by reference. The above-described structure of the expansion/contraction part 3 is merely an example, and the structure thereof is not limited to this example. The structure of the expansion/contraction part 3 may be arbitrarily determined as long as the required rigidity thereof can be ensured.

The first engagement part 4 is disposed at the tip of the columnar structure 35 of the expansion/contraction part 3. The first engagement part 4 includes an engaging mechanism for engaging with a member located in the surrounding environment. The engaging mechanism is composed of, for example, a disk-shaped plate member 4 and functions as a hooking mechanism for being hooked on a level surface located at a different height. A flat placement part 41 on which an object such as baggage can be placed is provided on the top surface of the disk-shaped plate 4. The moving body 1 can transport an object placed on this placement part 41.

The first engagement part 4 may be, for example, a sucking mechanism for sticking to a level surface located at a different height or a magnetically-sticking mechanism for magnetically sticking to a level surface located at a different height, or may be other arbitrary engaging mechanisms as long as they can engage with a member located in the surrounding environment.

The control unit 5 controls the moving part 2 and the expansion/contraction part 3. The control unit 5 can control the rotation of each of the driving wheels 22 by transmitting a control signal to a respective one of the motors 24 of the moving part 2, and thereby can move the moving body main body 21 to an arbitrary position. The control unit 5 can expand and contract the columnar structure 35 in the axial direction by transmitting a control signal to the rotation apparatus 36 of the expansion/contraction part 3, and thereby can control the height position (i.e., the vertical position) of the first engagement part 4.

The control unit 5 may control the movement of the moving body 1 by performing well-known control such as feedback control and robust control based on information about the rotations of the driving wheels 22 detected by a rotation sensor(s) provided in the driving wheels 22. The control unit 5 may autonomously move the moving body 1 by controlling the moving part 2 and the expansion/contraction part 3 based on information such as distance information detected by a range sensor such as a camera or an ultrasonic sensor provided in the moving body 1 and map information of the moving environment.

For example, the control unit 5 may be formed by hardware mainly using a microcomputer including a CPU (Central Processing Unit) 51 that performs control processing, arithmetic processing, and so on, a memory 52 including a ROM (Read Only Memory) and/or a RAM (Random Access Memory) that stores a control program, an arithmetic program, and so on to be executed by the CPU 51, and an interface unit (I/F) 53 that externally receives and outputs signals. The CPU 51, the memory 52, and the interface unit 53 are connected with each other through a data bus or the like.

It should be noted that a conventional moving body can move only between level surfaces that are connected by, for example, a vertical member such as a lifting/lowering pole. Therefore, there is a restriction that the moving body cannot move to a detached level surface that is not connected by a vertical member.

In contrast to this, the moving body 1 according to this embodiment moves the moving part 2 to a target height position by engaging the first engagement part 4 with a member located at the target height position and then expanding or contracting the expansion/contraction part 3. In this way, the moving body 1 can move itself to the target height position and lower itself onto a floor surface located at that height position, without using any vertical member, by engaging the first engagement part 4 with a member located at the target height position and then expanding or contracting the expansion/contraction part 3. Therefore, the moving body 1 can freely move between level surfaces located at different heights that are not connected by a vertical member.

The moving body 1 may further include a fixing part 6 that fixes the moving part 2 when the expansion/contraction part 3 is expanded or contracted. In this way, the movement of the moving part 2 can be stabilized during the period in which the expansion/contraction part 3 of the moving body 1 is being expanded or contracted. For example, when the expansion/contraction part 3 is expanded and gets closer to its upper limit, the moving part 2 may become unstable due to the weight of the object placed on the placement part 41 of the first engagement part 4. However, the moving part 2 can be stabilized by fixing the moving part 2 by the fixing part 6.

The fixing part 6 may be a fixing bar or the like that extends to the outside of the moving part 2 and lands on (i.e., comes into contact with) a road surface when the expansion/contraction part 3 is expanded or contracted. Further, the fixing part 6 may be a braking mechanism for putting a brake(s) on the driving wheels 22 and the driven wheels 23, or may be a combination of the above-described fixing bar and the braking mechanism.

When the control unit 5 has determined that the first engagement part 4 has engaged with a member located at the target height position, the control unit 5 may perform control so as to move the moving part 2 to the target height position by expanding or contracting the expansion/contraction part 3. In this way, the moving part 2 can be stably moved to the target height position in a state where the first engagement part 4 is reliably engaged with the member located at the target height position.

Figure 5:
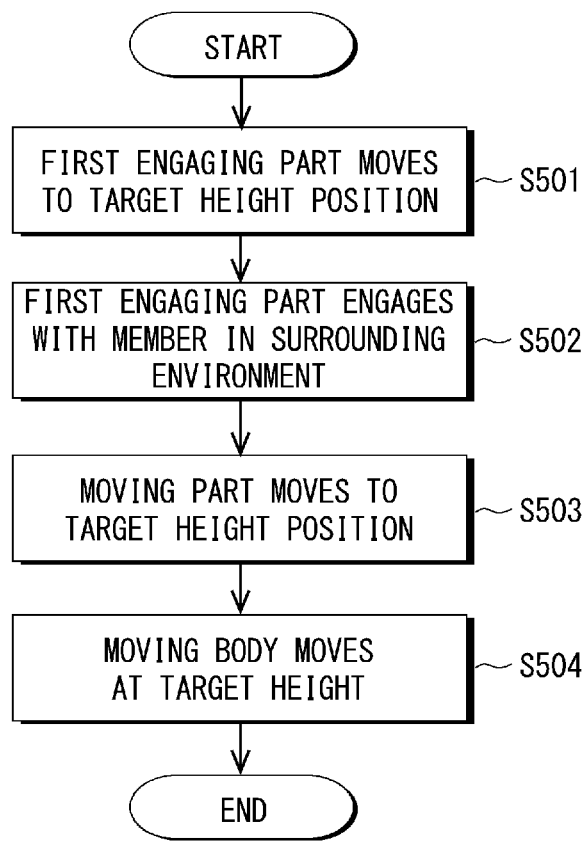
FIG. 5 is a flow chart showing a flow of a moving method according to an embodiment.

FIG. 5 is a flowchart showing a flow of a moving method according to this embodiment.

Firstly, the control unit 5 moves the first engagement part 4 to a target height position by controlling the expansion/contraction of the expansion/contraction part 3 (step S501).

The control unit 5 engages the first engagement part 4 with a member located in the surrounding environment at the target height position (step S502).

The control unit 5 moves the moving part 2 to the target height position and lowers it onto a floor surface located at that height position by controlling the expansion/contraction of the expansion/contraction part 3 (step S503).

The control unit 5 contracts (i.e., shortens) the expansion/contraction part 3. The control unit 5 moves the moving body 1 on the floor surface located at the target height position by controlling the movement of the moving part 2 (step S504).

As described above, the moving body 1 according to this embodiment includes the movable moving part 2, the expansion/contraction part 3 disposed in the moving part 2 and configured to expand and contract in the vertical direction, the first engagement part 4 disposed at the tip of the expansion/contraction part 3 and configured to engage with a member located in the surrounding environment, and the control unit 5 configured to control the moving part 2 and the expansion/contraction part 3, in which the control unit 5 moves the moving part 2 to a target height position by engaging the first engagement part 4 with a member located at the target height position and then expanding or contracting the expansion/contraction part 3. In this way, the moving body 1 can move itself to the target height position and lower itself onto a floor surface located at that height position by engaging the first engagement part 4 with a member located at the target height position and then expanding or contracting the expansion/contraction part 3. Therefore, the moving body 1 can freely move between level surfaces located at different heights that are not connected by a vertical member.

Second Embodiment

Figure 6:
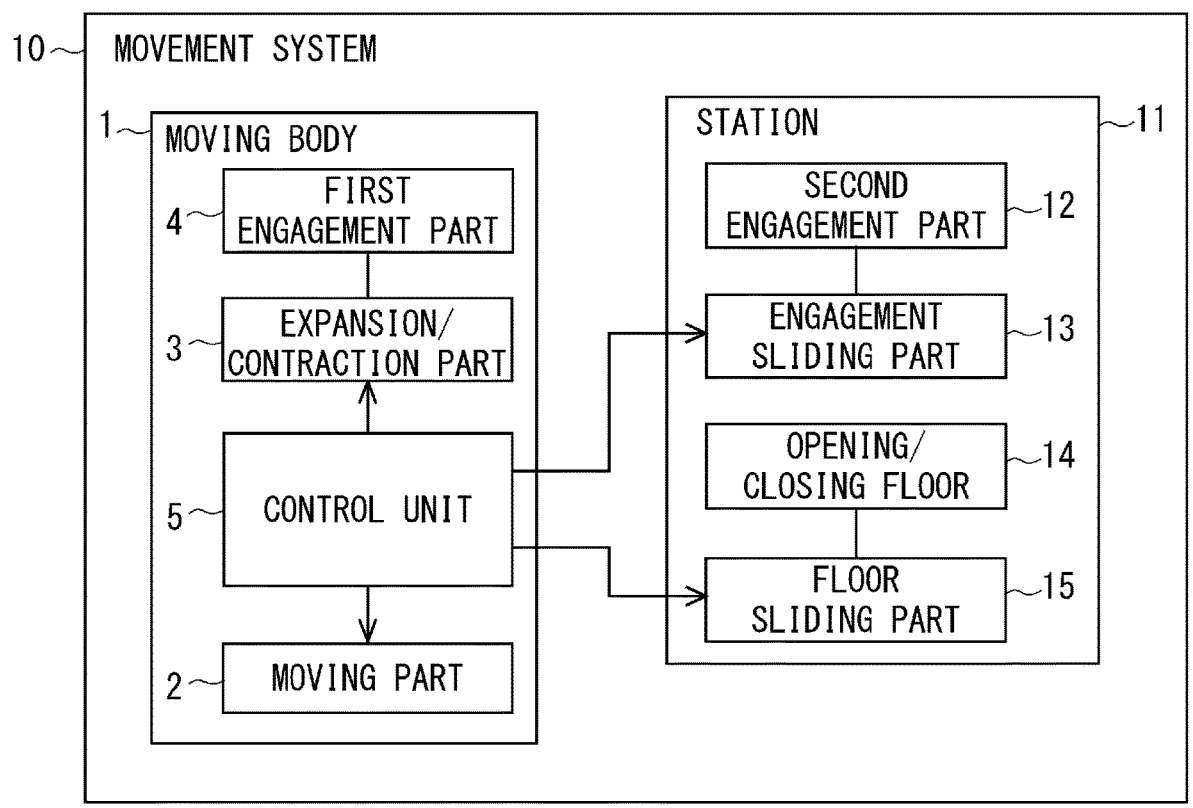
FIG. 6 is a block diagram showing a schematic system configuration of a movement system according to an embodiment.
Figure 7:
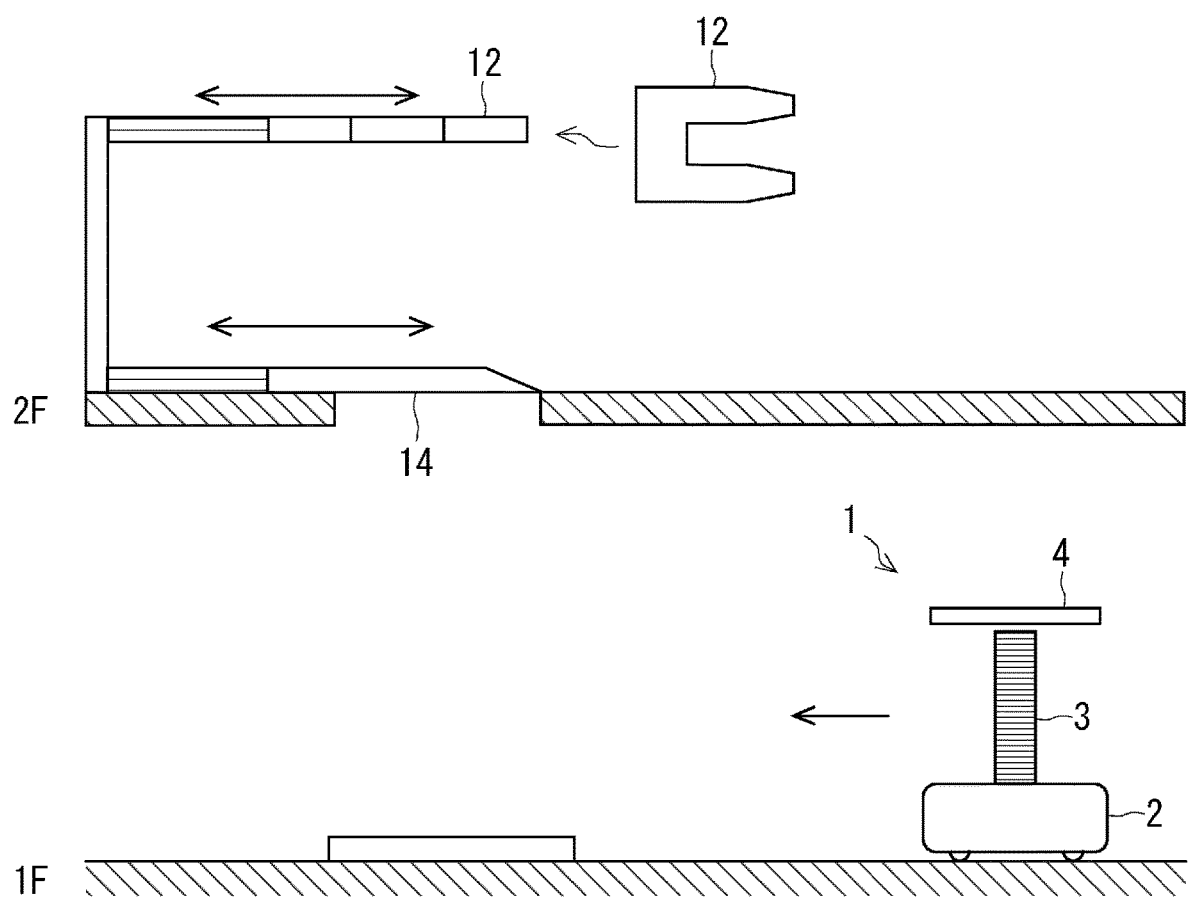
FIG. 7 shows a schematic configuration of a station according to an embodiment.

FIG. 6 is a block diagram showing a schematic system configuration of a movement system according to this embodiment. FIG. 7 shows a schematic configuration of a station according to this embodiment. The movement system 10 according to this embodiment includes a moving body 1 according to the above-described first embodiment and a station 11 in which the moving body 1 moves up and down.

The station 11 according to this embodiment is disposed in the moving environment of the moving body 1. The station 11 includes a second engagement part 12 that engages with the first engagement part 4 of the moving body 1, an engagement sliding part 13 that slides the second engagement part 12, an opening/closing floor 14 that slides on a floor surface, and a floor sliding part 15 that slides the opening/closing floor 14.

For example, as shown in FIG. 7, the second engagement part 12 is formed in a fork-like shape. The second engagement part 12 is disposed so that it can slide in the horizontal direction in a place located above the opening/closing floor 14. The second engagement part 12 slides in the horizontal direction and is hooked (or caught) on the under surface of the disk-shaped first engagement part 4 of the moving body 1, so that the second engagement part 12 engages with the first engagement part 4.

The control unit 5 of the moving body 1 can wirelessly communicate with the engagement sliding part 13 and the floor sliding part 15 by using, for example, a wireless LAN (Local Area Network).

The engagement sliding part 13 includes a sliding mechanism for horizontally sliding the second engagement part 12 at a predetermined height from the floor surface, a motor that drives the sliding mechanism, and so on.

The engagement sliding part 13 slides the second engagement part 12 according to a control signal transmitted from the control unit 5 of the moving body 1. For example, the engagement sliding part 13 engages the second engagement part 12 with the first engagement part 4 by sliding the second engagement part 12 in response to an engagement signal transmitted from the control unit 5 of the moving body 1. The engagement sliding part 13 disengages the second engagement part 12 from the first engagement part 4 by sliding the second engagement part 12 in response to a disengagement signal transmitted from the control unit 5 of the moving body 1.

The opening/closing floor 14 horizontally slides above a through hole formed in the floor surface. The through hole in the floor surface is formed in such a size that the moving body 1 can vertically pass therethrough. The opening/closing floor 14 is formed in such a size that it can close the through hole when it is positioned over the through hole.

For example, when the opening/closing floor 14 is slid and hence the through hole becomes a closed state, the moving part 2 can get on the opening/closing floor 14 and travel thereon. In the normal state, the opening/closing floor 14 is in the closed state. In contrast, when the opening/closing floor 14 is slid and hence the through hole becomes an opened state, the moving body 1 can vertically pass through the through hole.

The floor sliding part 15 includes a sliding mechanism for horizontally sliding the opening/closing floor 14, a motor that drives the sliding mechanism, and so on.

The floor sliding part 15 slides the opening/closing floor 14 according to a control signal transmitted from the control unit 5 of the moving body 1. For example, the floor sliding part 15 slides the opening/closing floor 14 in response to a closing signal transmitted from the control unit 5 of the moving body 1 and thereby closes the through hole in the floor surface. The floor sliding part 15 slides the opening/ closing floor 14 in response to an opening signal transmitted from the control unit 5 of the moving body 1 and thereby opens the through hole in the floor surface.

Next, an example of a method for moving the moving body 1 from a first-floor surface to a second-floor surface in the movement system will be described with reference to FIGS. 8 to 17.

The control unit 5 of the moving body 1 moves the moving body 1 to a predetermined position directly below the through hole in the second-floor surface by controlling the moving part 2 (FIG. 8).

Note that the control unit 5 can move the moving body 1 to the predetermined position based on image information acquired by the moving body 1 or a camera provided in the moving environment. Further, the control unit 5 may move the moving body 1 to the predetermined position when it has determined that there is no object such as an obstacle in the predetermined position based on image information acquired by a camera or information obtained by an ultrasonic sensor. In this way, it is possible, after it is confirmed that there is no obstructive object in the predetermined position, to reliably move the moving body 1 to the predetermined position and move it up or down. The camera and the ultrasonic sensor are specific examples of the object detection unit.

Figure 9:
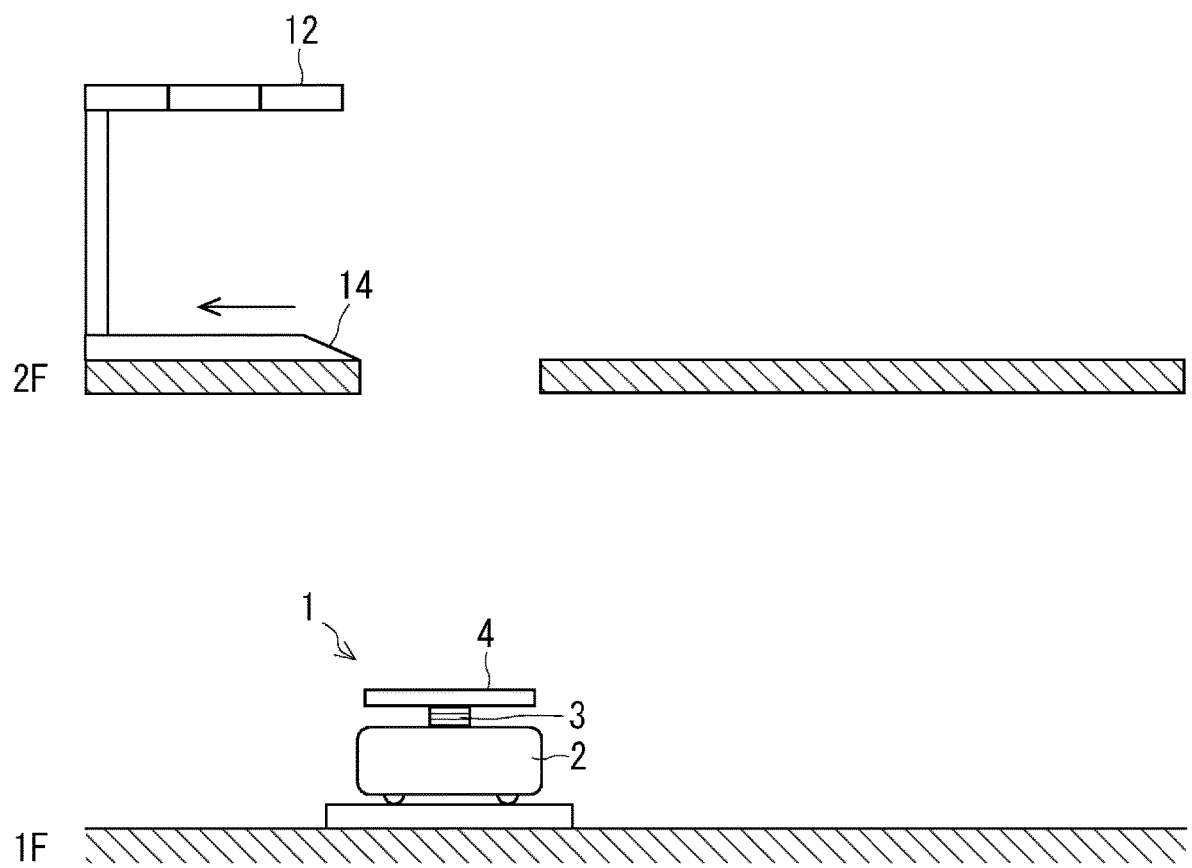
FIG. 9 shows a diagram for explaining the example of the method for moving the moving body from the first-floor surface to the second-floor surface.

When the control unit 5 of the moving body 1 determines that the moving part 2 has moved to the predetermined position directly below the through hole, it transmits an opening signal to the floor sliding part 15 of the station 11. The floor sliding part 15 slides the opening/closing floor 14 in response to the opening signal sent from the control unit 5 and thereby opens the through hole in the floor surface (FIG. 9).

Figure 10:
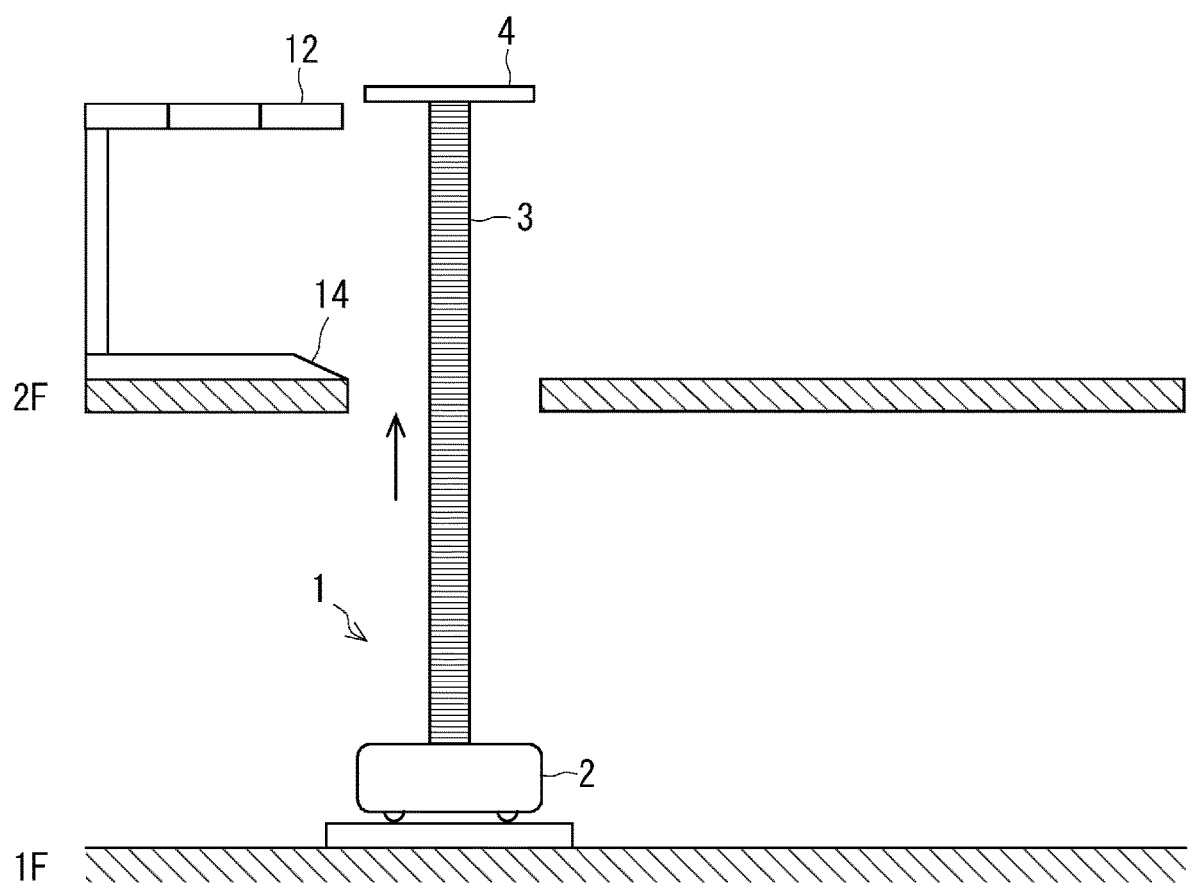
FIG. 10 shows a diagram for explaining the example of the method for moving the moving body from the first-floor surface to the second-floor surface.

When the control unit 5 has determined that the through hole in the floor surface has become the opened state, it moves the first engagement part 4 to the height position of the second engagement part 12 of the second-floor surface, i.e., to the target height position by expanding the expansion/contraction part 3 (FIG. 10). Note that the control unit 5 may determine the opened/closed state of the opening/closing floor 14 based on image information acquired by the moving body 1 or a camera provided in the moving environment. The control unit 5 may determine the opened/closed state of the opening/closing floor 14 based on information obtained by a sensor provided in the opening/closing floor 14.

Figure 11:
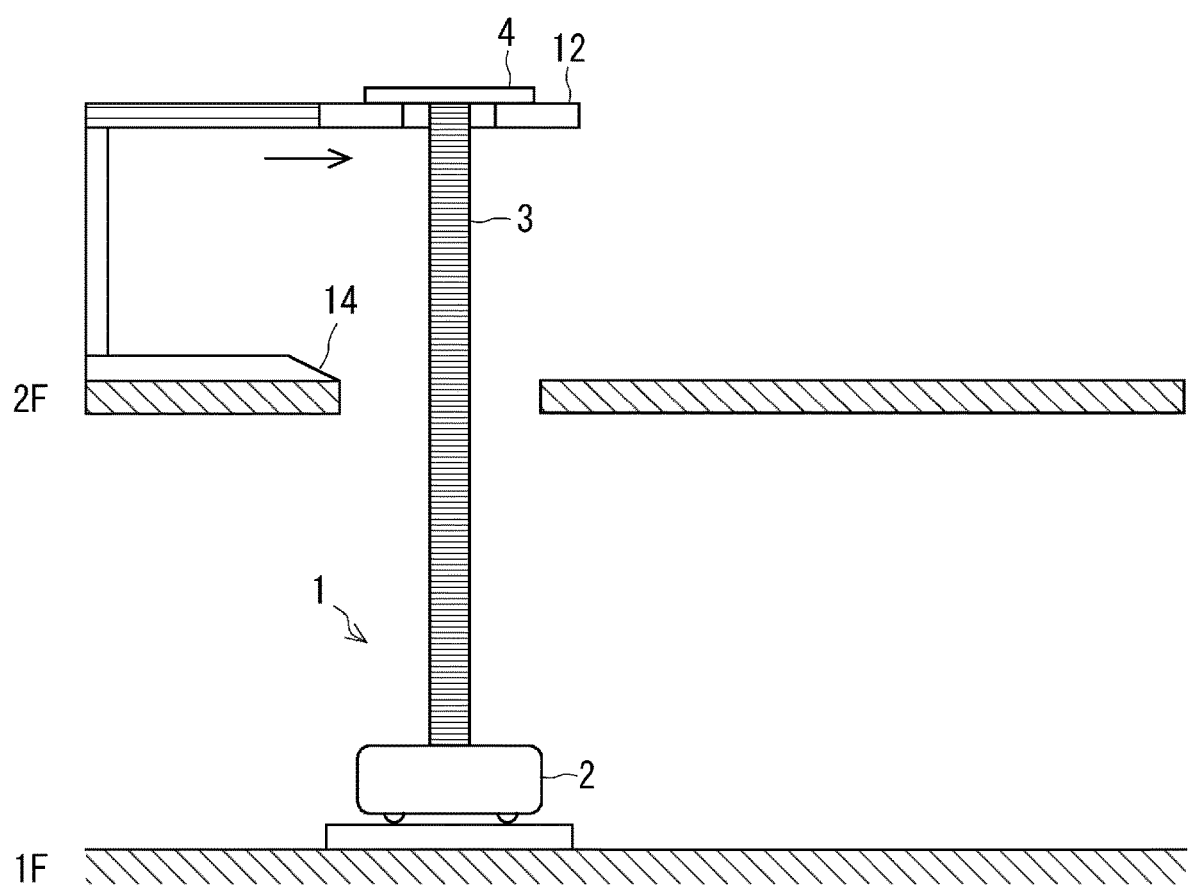
FIG. 11 shows a diagram for explaining the example of the method for moving the moving body from the first-floor surface to the second-floor surface.

When the control unit 5 has determined that the first engagement part 4 has moved to the height position of the second engagement part 12 of the second-floor surface, it transmits an engagement signal to the engagement sliding part 13. The engagement sliding part 13 slides the second engagement part 12 in response to the engagement signal transmitted from the control unit 5 and thereby engages it with the first engagement part 4 (FIG. 11). Note that the control unit 5 may determine that the first engagement part 4 has moved to the height position of the second engagement part 12 of the second-floor surface based on image information acquired by the moving body 1 or a camera provided in the moving environment. The control unit 5 may determine that the first engagement part 4 has moved to the height position of the second engagement part 12 of the second-floor surface based on information obtained by a sensor provided in the expansion/contraction part 3 or the like.

Figure 12:
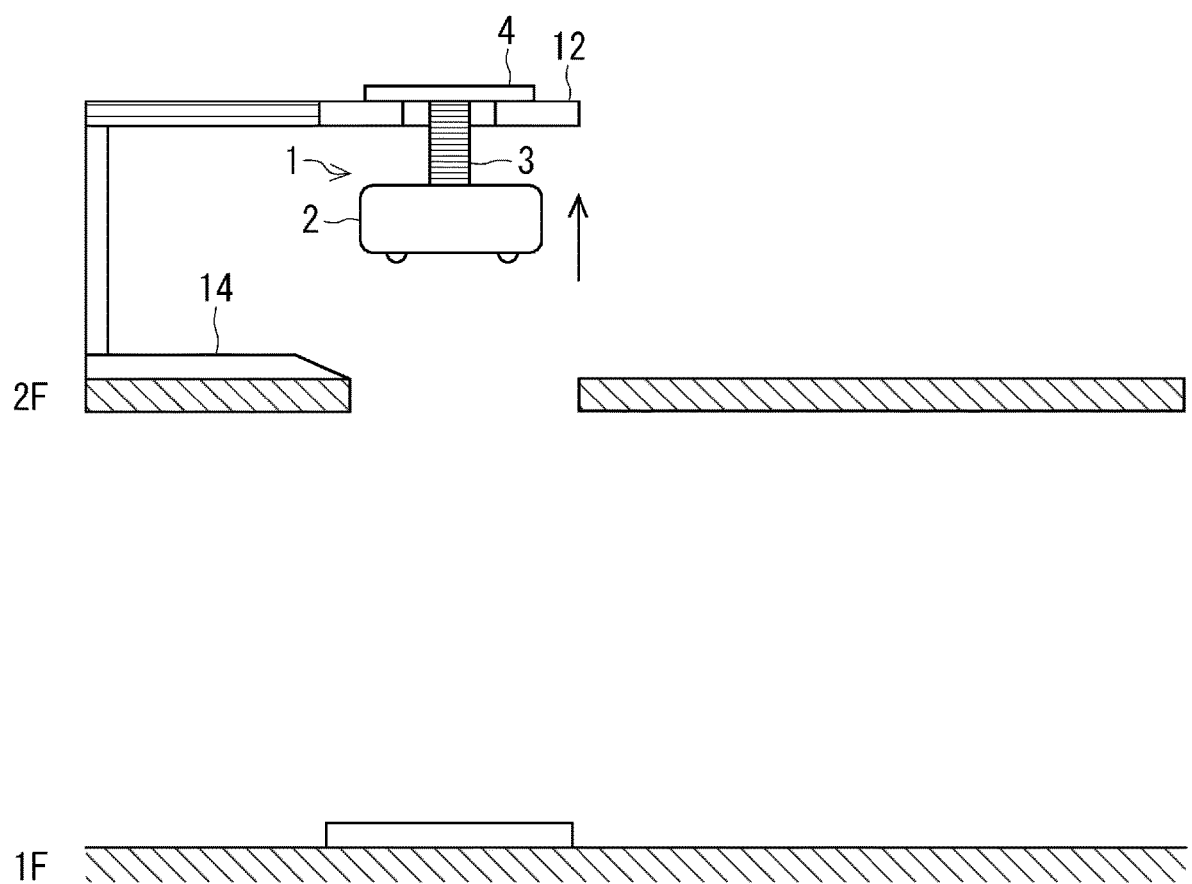
FIG. 12 shows a diagram for explaining the example of the method for moving the moving body from the first-floor surface to the second-floor surface.

When the control unit 5 has determined that the second engagement part 12 has engaged with the first engagement part 4, it pulls up (i.e., lifts) the moving part 2 to a position that is higher than the second-floor surface, i.e., the target position by a predetermined length by contracting (i.e., shortening) the expansion/contraction part 3 (FIG. 12). The above-described predetermined length is stored in a memory or the like in advance. As the above-described predetermined length, a length because of which the opening/closing floor 14 does not come into contact with any component located in the underside of the moving part 2 (such as a wheel) when the opening/closing floor 14 is opened or closed is set. The control unit 5 may determine that the second engagement part 12 has engaged with the first engagement part 4 based on image information acquired by the moving body 1 or a camera provided in the moving environment. The control unit 5 may determine that the second engagement part 12 has engaged with the first engagement part 4 based on information obtained by a sensor disposed in the first engagement part 4 or the second engagement part 12, or the like.

Figure 13:
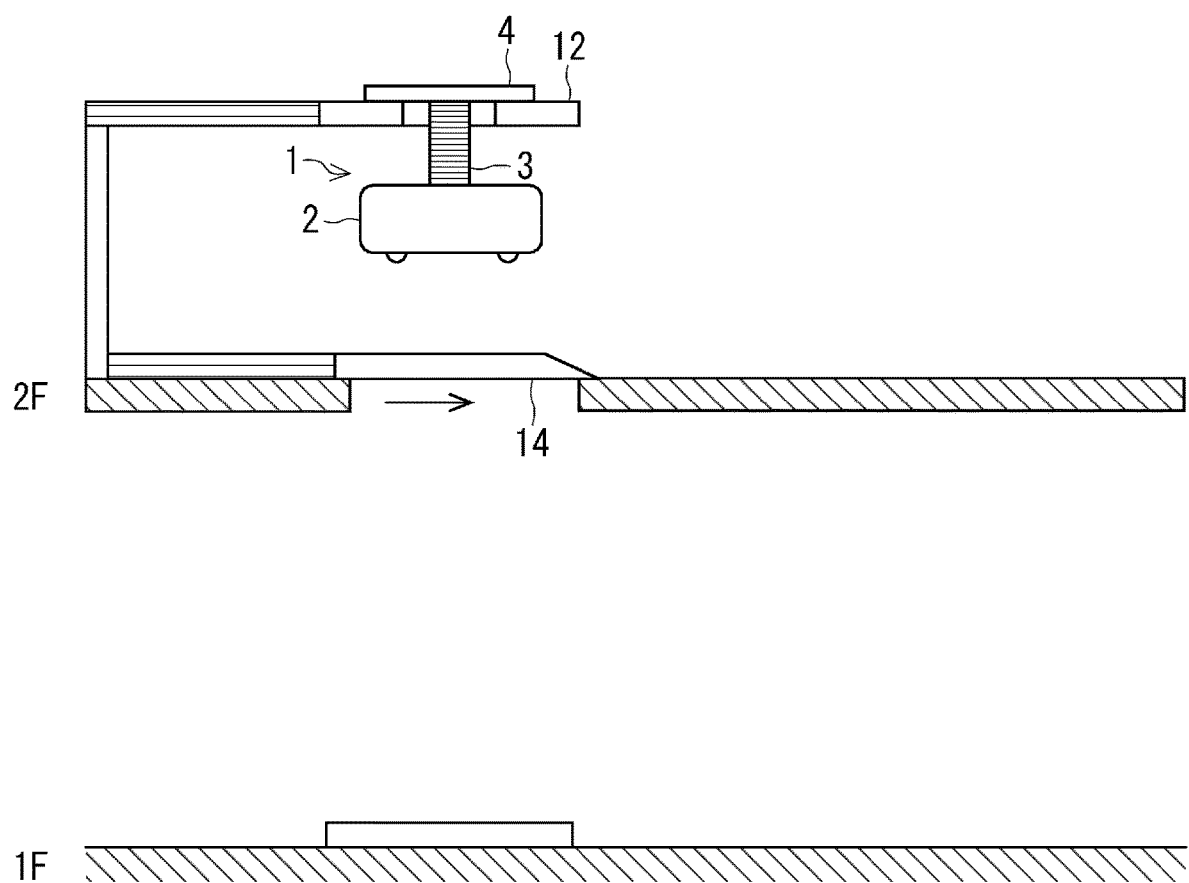
FIG. 13 shows a diagram for explaining the example of the method for moving the moving body from the first-floor surface to the second-floor surface.

When the control unit 5 has determined that the moving part 2 has been pulled up (i.e., lifted) to the position higher than the second-floor surface, i.e., the target position by the predetermined length, it transmits a closing signal to the floor sliding part 15. The floor sliding part 15 slides the opening/closing floor 14 in response to the closing signal sent from the control unit 5 and thereby closes the through hole in the floor surface (FIG. 13). The control unit 5 may determine that the moving part 2 has been pulled up (i.e., lifted) to the position higher than the second-floor surface by the predetermined length based on information (such as a contraction length) obtained by a sensor provided in the expansion/contraction part 3.

Figure 14:
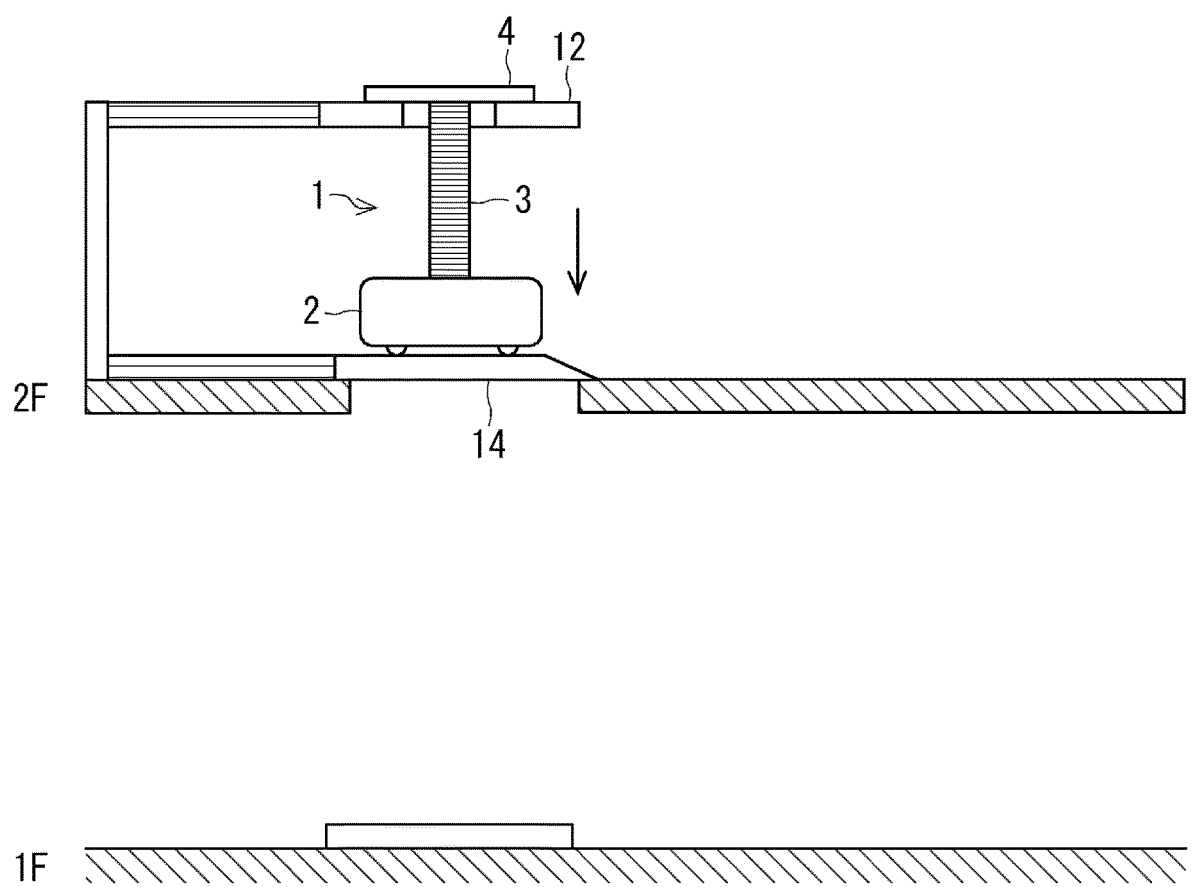
FIG. 14 shows a diagram for explaining the example of the method for moving the moving body from the first-floor surface to the second-floor surface.

When the control unit 5 has determined that the opening/closing floor 14 has become the closed state, it lowers the moving part 2 onto the opening/closing floor 14 by expanding the expansion/contraction part 3 (FIG. 14).

Figure 15:
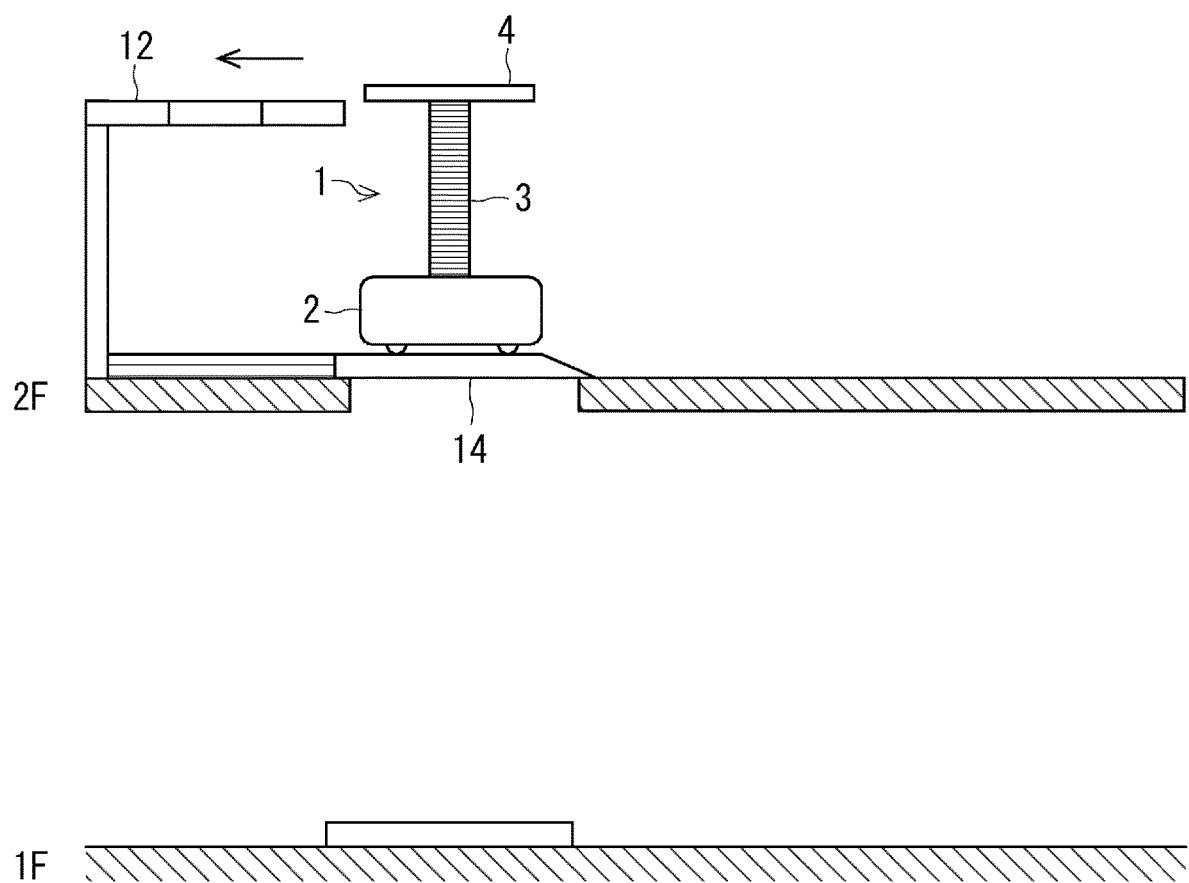
FIG. 15 shows a diagram for explaining the example of the method for moving the moving body from the first-floor surface to the second-floor surface.

When the control unit 5 has determined that the moving part 2 has been placed on the opening/closing floor 14, it transmits a disengagement signal to the engagement sliding part 13. In response to the disengagement signal transmitted from the control unit 5, the engagement sliding part 13 slides the second engagement part 12 and thereby disengages it from the first engagement part 4 (FIG. 15). The control unit 5 may determine that the moving part 2 has been lowered onto the opening/closing floor 14 based on information (such as a contraction length) obtained by a sensor provided in the expansion/contraction part 3.

Figure 16:
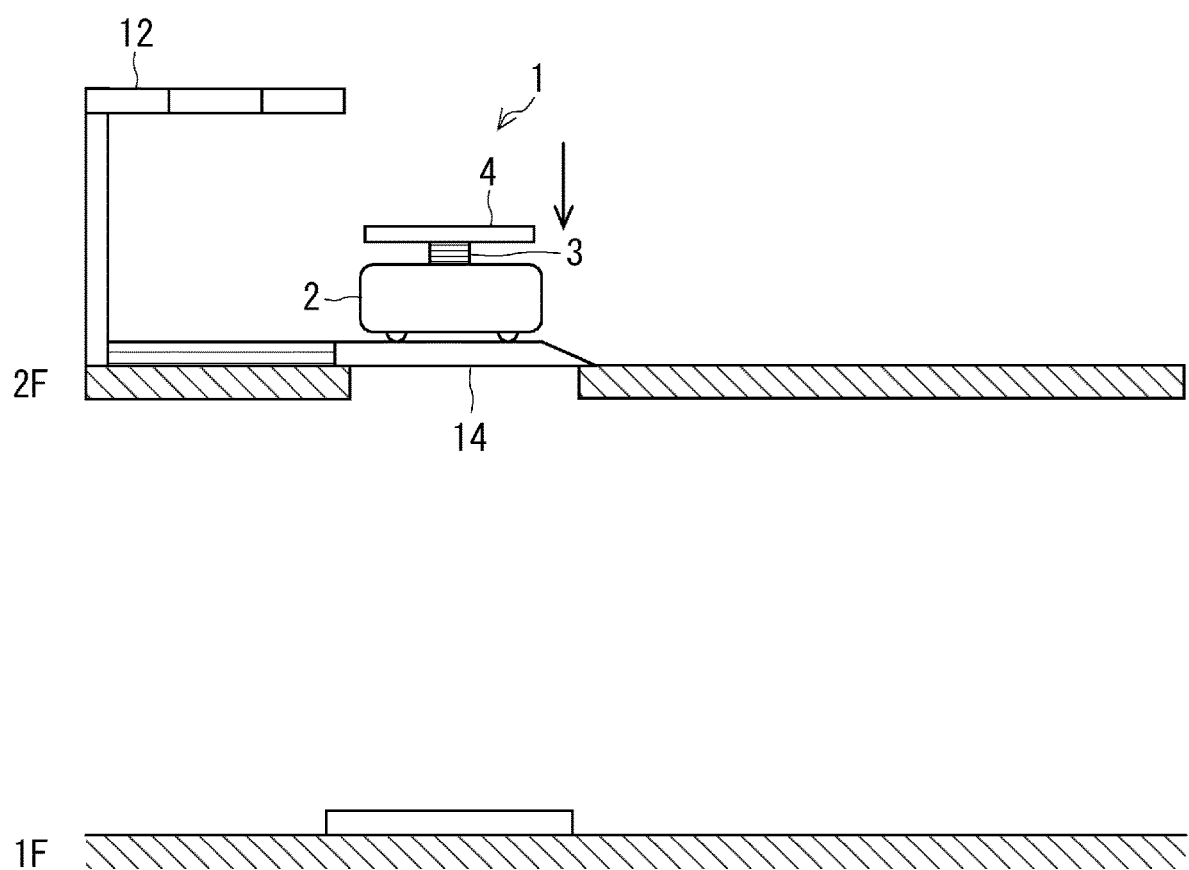
FIG. 16 shows a diagram for explaining the example of the method for moving the moving body from the first-floor surface to the second-floor surface.

When the control unit 5 has determined that the first engagement part 4 has been disengaged from the second engagement part 12, the control unit 5 contracts the expansion/contraction part 3 into its most contracted state (hereinafter simply referred to as a contracted state) (FIG. 16).

Figure 17:
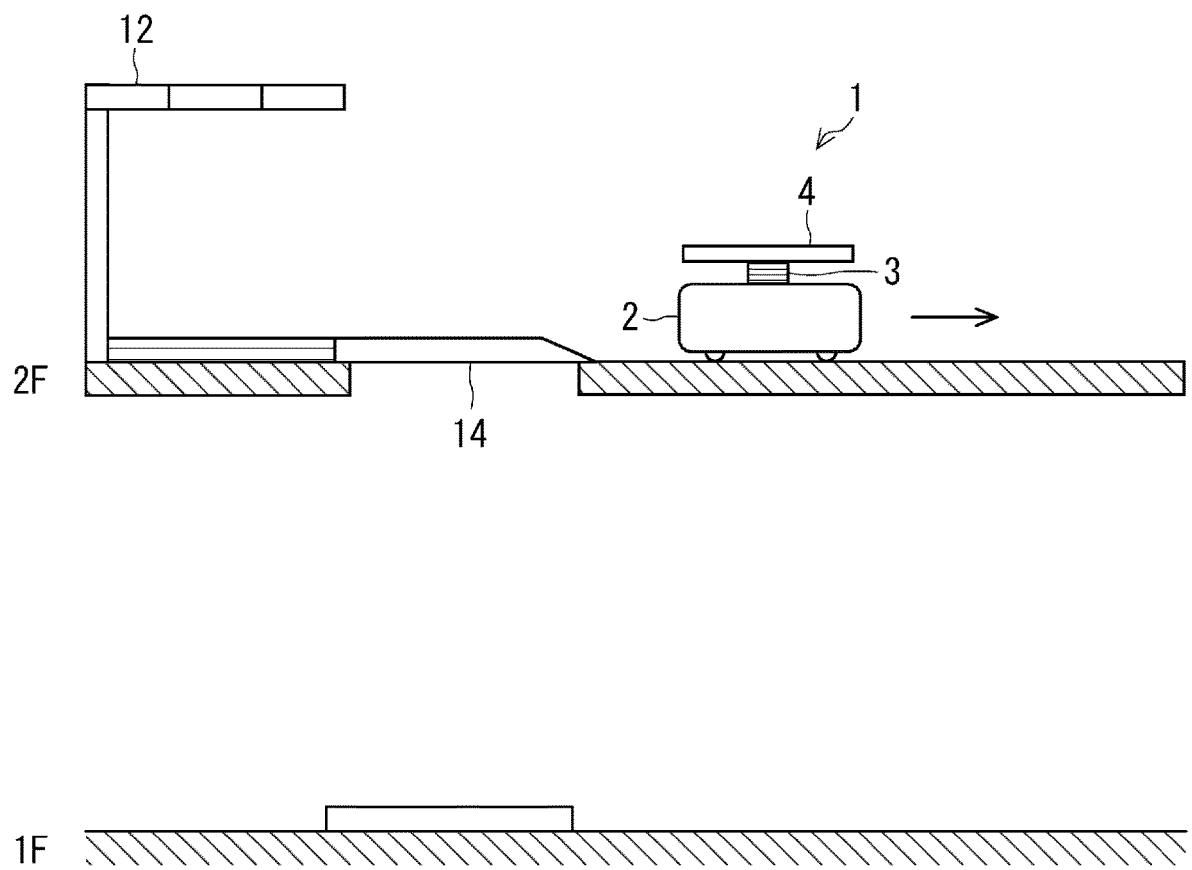
FIG. 17 shows a diagram for explaining the example of the method for moving the moving body from the first-floor surface to the second-floor surface.

When the control unit 5 has determined that the expansion/contraction part 3 has become the contracted state, it moves the moving body 1 to a desired position on the second floor by controlling the moving part 2 (FIG. 17).

Figure 18:
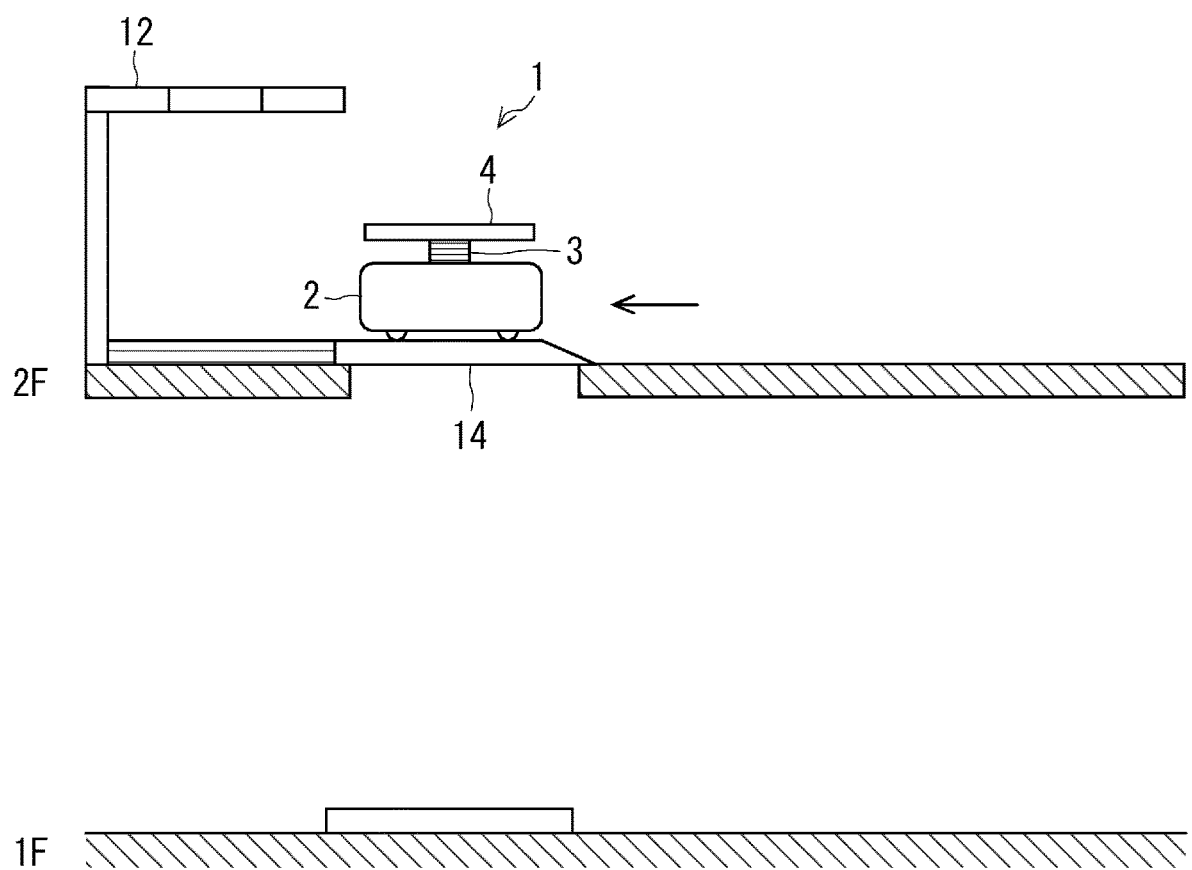
FIG. 18 shows a diagram for explaining an example of a method for moving a moving body from a second-floor surface to a first-floor surface.

Next, an example of a method for moving the moving body 1 from a second-floor surface to a first-floor surface in the movement system 10 will be described with reference to FIGS. 18 to 26. The control unit 5 of the moving body 1 moves the moving body 1 to a position on the opening/closing floor 14 disposed on the second-floor surface by controlling the moving part 2 based on image information acquired by a camera or the like (FIG. 18). Note that the control unit 5 may move the moving body 1 to the position on the opening/closing floor 14 when it has determined that there is no object such as an obstacle on the opening/closing floor 14 based on image information acquired by a camera or information obtained by an ultrasonic sensor.

Figure 19:
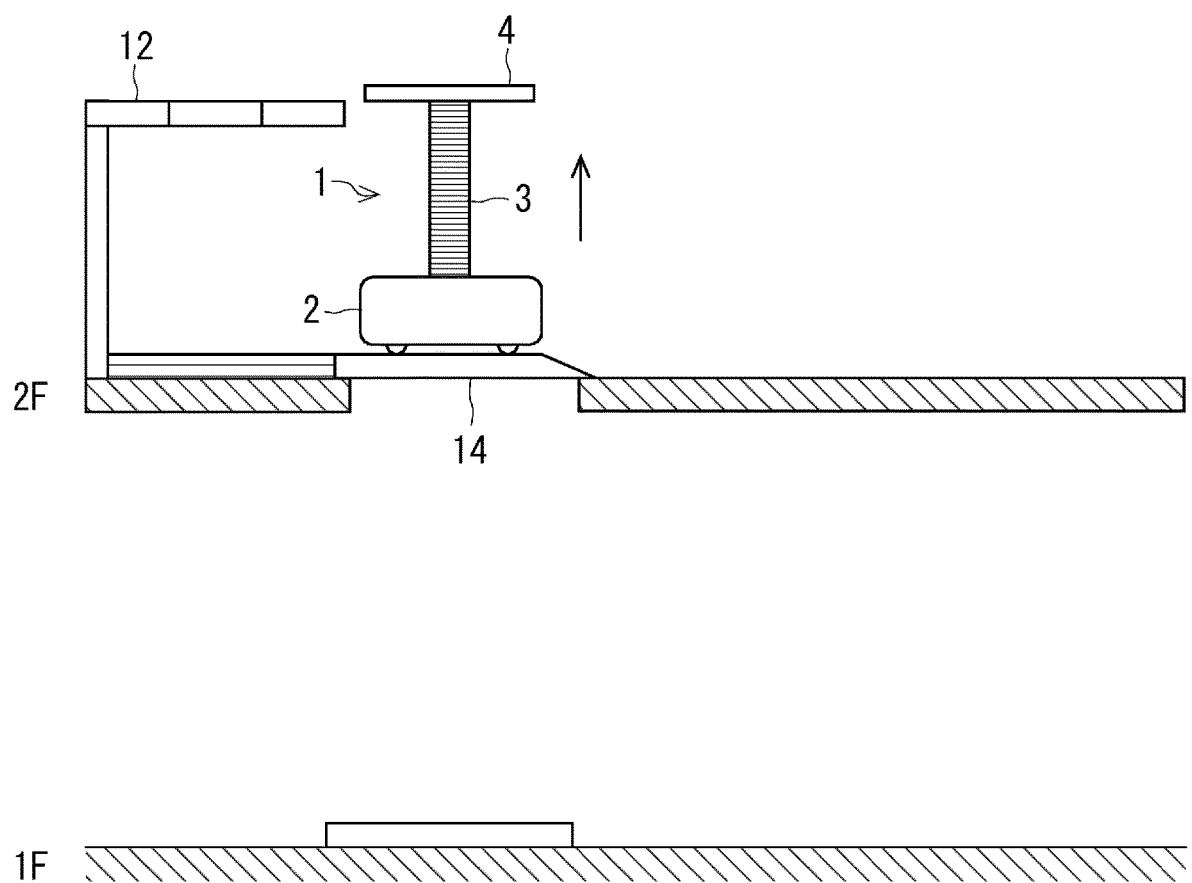
FIG. 19 shows a diagram for explaining the example of the method for moving the moving body from the second-floor surface to the first-floor surface.

When the control unit 5 has determined that the moving part 2 has moved to the position on the opening/closing floor 14, it moves the first engagement part 4 to the height position of the second engagement part 12 by expanding the expansion/contraction part 3 (FIG. 19).

Figure 20:
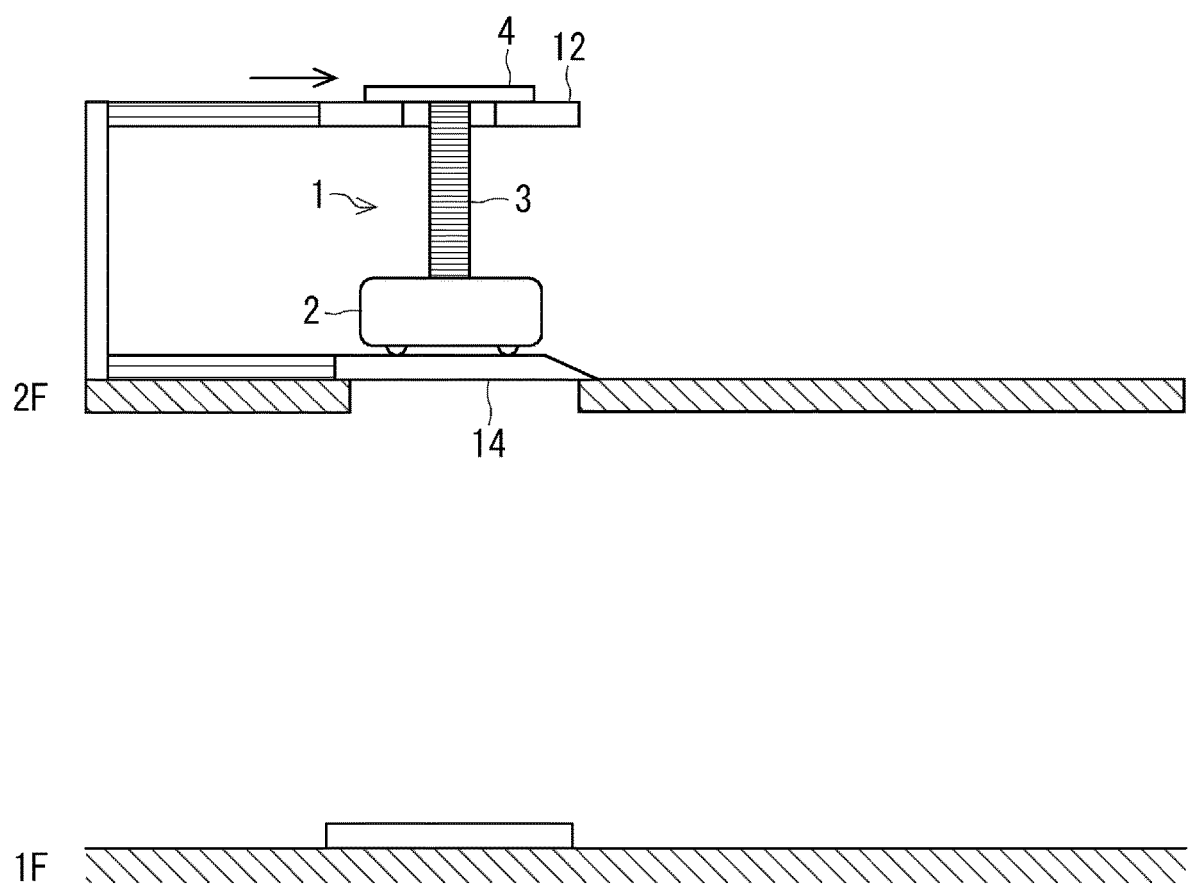
FIG. 20 shows a diagram for explaining the example of the method for moving the moving body from the second-floor surface to the first-floor surface.

When the control unit 5 has determined that the first engagement part 4 has moved to the height position of the second engagement part 12, it transmits an engagement signal to the engagement sliding part 13. The engagement sliding part 13 slides the second engagement part 12 in response to the engagement signal transmitted from the control unit 5 and thereby engages it with the first engagement part 4 (FIG. 20).

Figure 21:
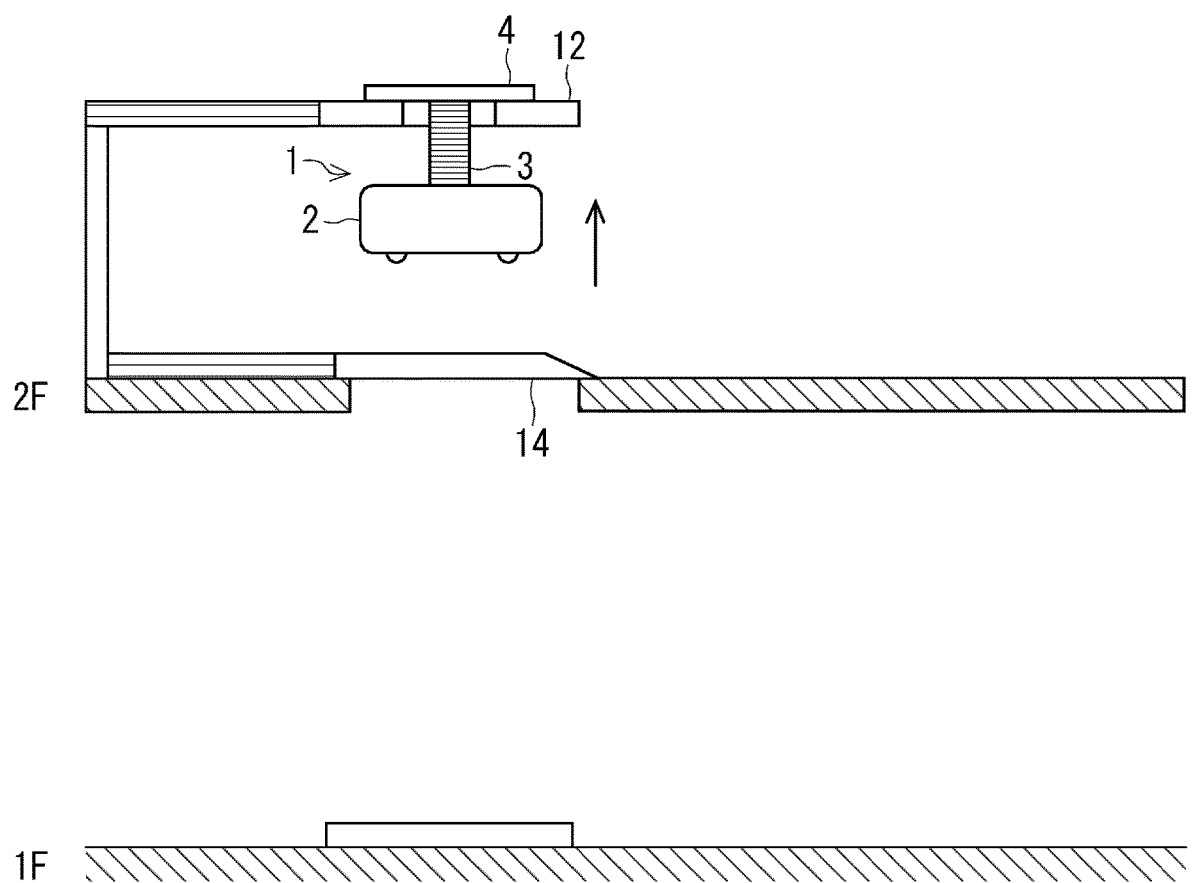
FIG. 21 shows a diagram for explaining the example of the method for moving the moving body from the second-floor surface to the first-floor surface.

When the control unit 5 has determined that the second engagement part 12 has engaged with the first engagement part 4, it pulls up (i.e., lifts) the moving part 2 to a position that is higher than the second-floor surface by a predetermined length by contracting (i.e., shortening) the expansion/contraction part 3 (FIG. 21).

Figure 22:
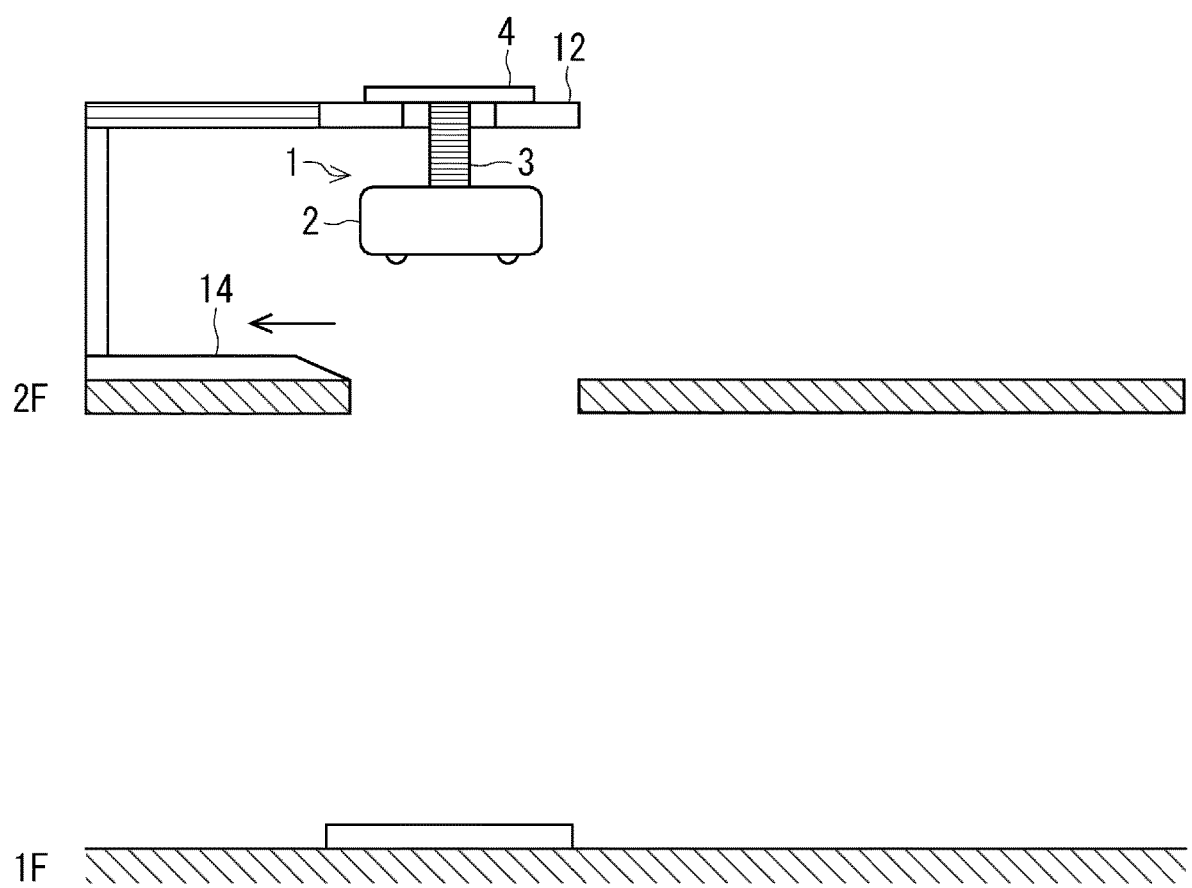
FIG. 22 shows a diagram for explaining the example of the method for moving the moving body from the second-floor surface to the first-floor surface.

When the control unit 5 has determined that the moving part 2 has been pulled up (i.e., lifted) to the position higher than the second-floor surface by the predetermined length, it transmits an opening signal to the floor sliding part 15. The floor sliding part 15 slides the opening/closing floor 14 in response to the opening signal from the control unit 5 and thereby opens the through hole in the floor surface (FIG. 22).

Figure 23:
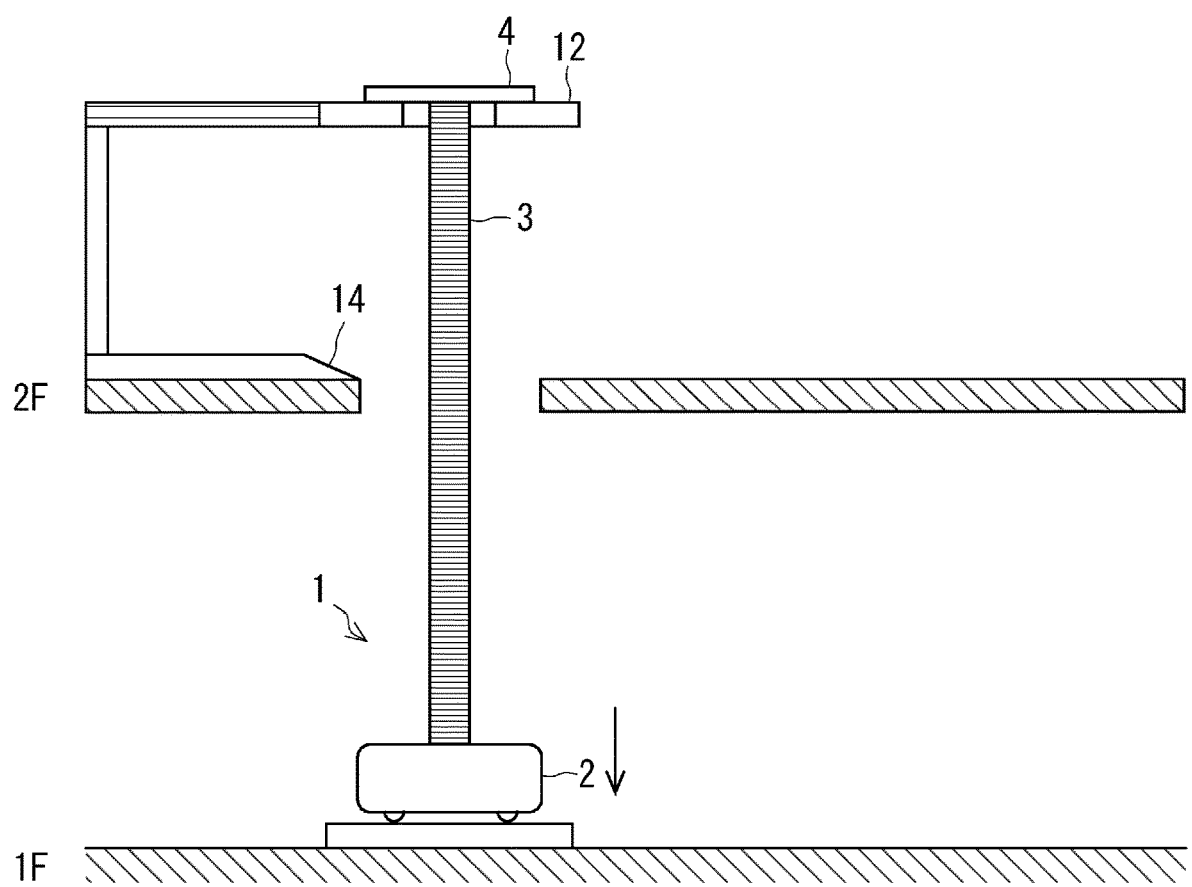
FIG. 23 shows a diagram for explaining the example of the method for moving the moving body from the second-floor surface to the first-floor surface.

When the control unit 5 has determined that the through hole in the floor surface has become the opened state, it lowers the moving part 2 onto a predetermined position on the first-floor surface, i.e., to the target position by expanding the expansion/contraction part 3 (FIG. 23).

Figure 24:
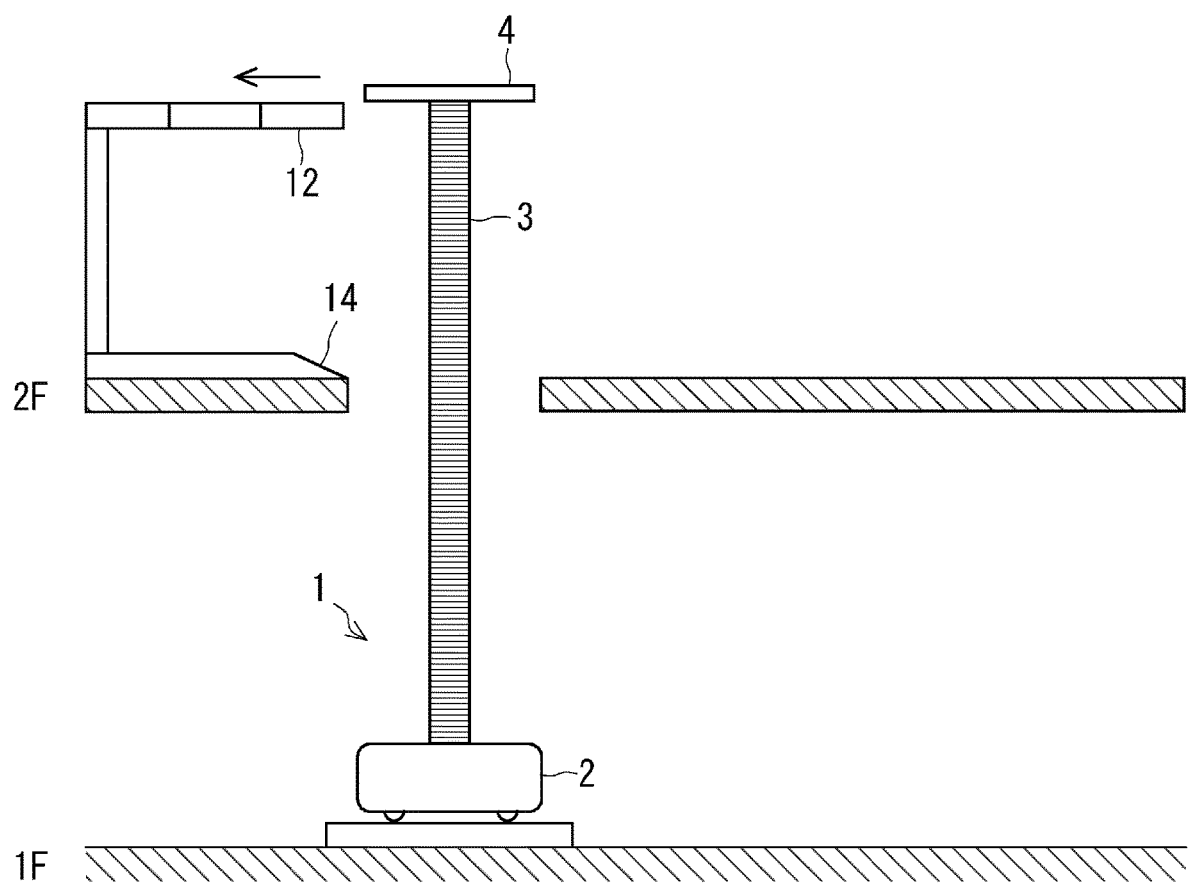
FIG. 24 shows a diagram for explaining the example of the method for moving the moving body from the second-floor surface to the first-floor surface.

When the control unit 5 has determined that the moving part 2 has been lowered onto the predetermined position on the first-floor surface, it transmits a disengagement signal to the engagement sliding part 13. The engagement sliding part 13 slides the second engagement part 12 in response to the disengagement signal transmitted from the control unit 5 and thereby disengages the second engagement part 12 from the first engagement part 4 (FIG. 24).

Figure 25:
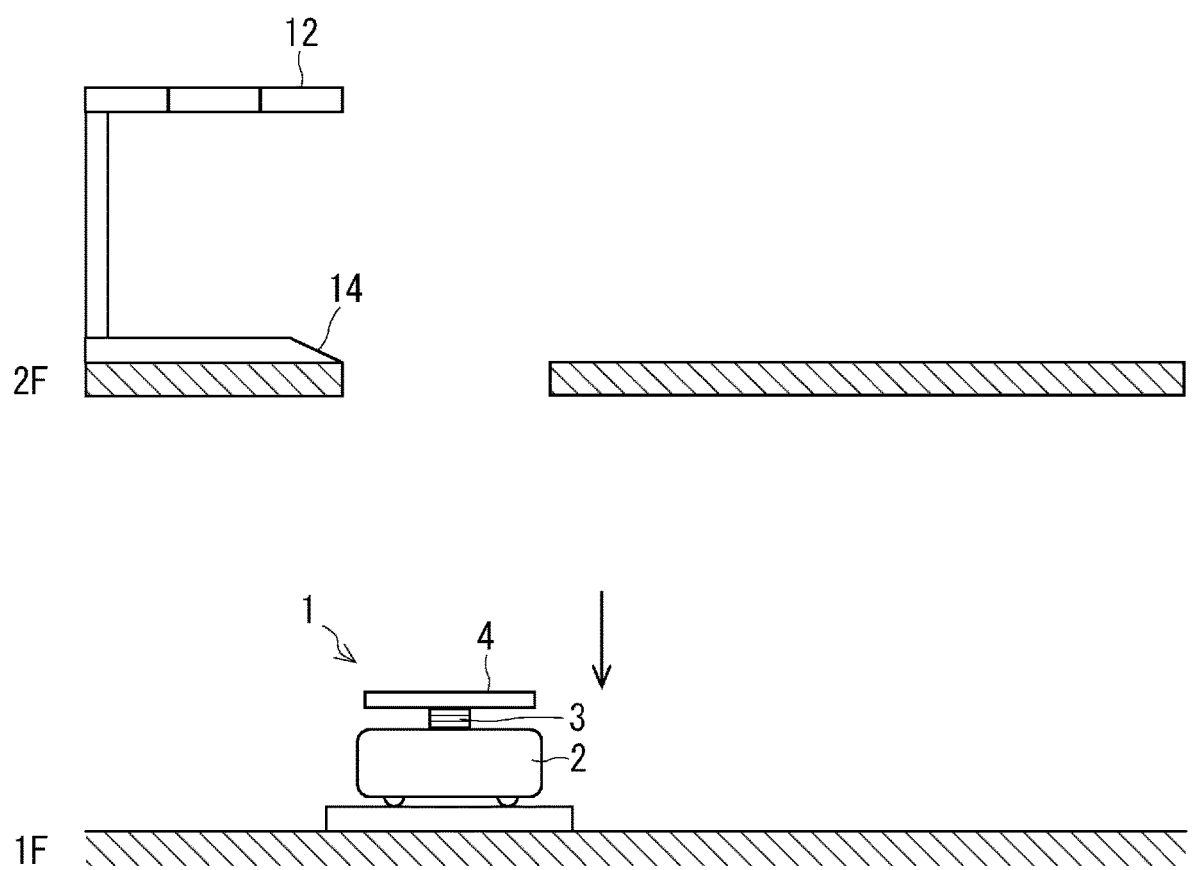
FIG. 25 shows a diagram for explaining the example of the method for moving the moving body from the second-floor surface to the first-floor surface.

When the control unit 5 has determined that the first engagement part 4 has been disengaged from the second engagement part 12, it contracts (i.e., shortens) the expansion/contraction part 3 into the contracted state (FIG. 25).

Figure 26:
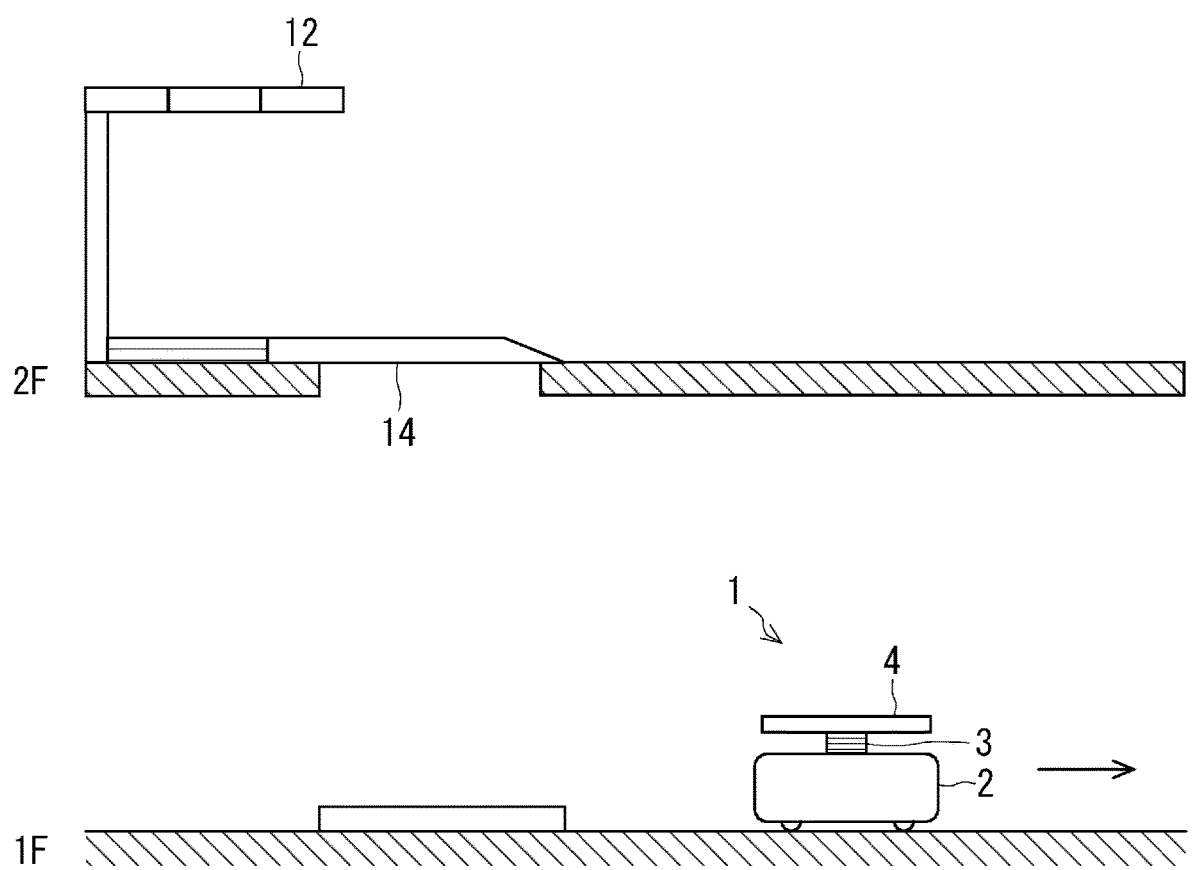
FIG. 26 shows a diagram for explaining the example of the method for moving the moving body from the second-floor surface to the first-floor surface.

When the control unit 5 has determined that the expansion/contraction part 3 has become the contracted state, it moves the moving body 1 to a desired position on the first floor by controlling the moving part 2 (FIG. 26).

Figure 27:
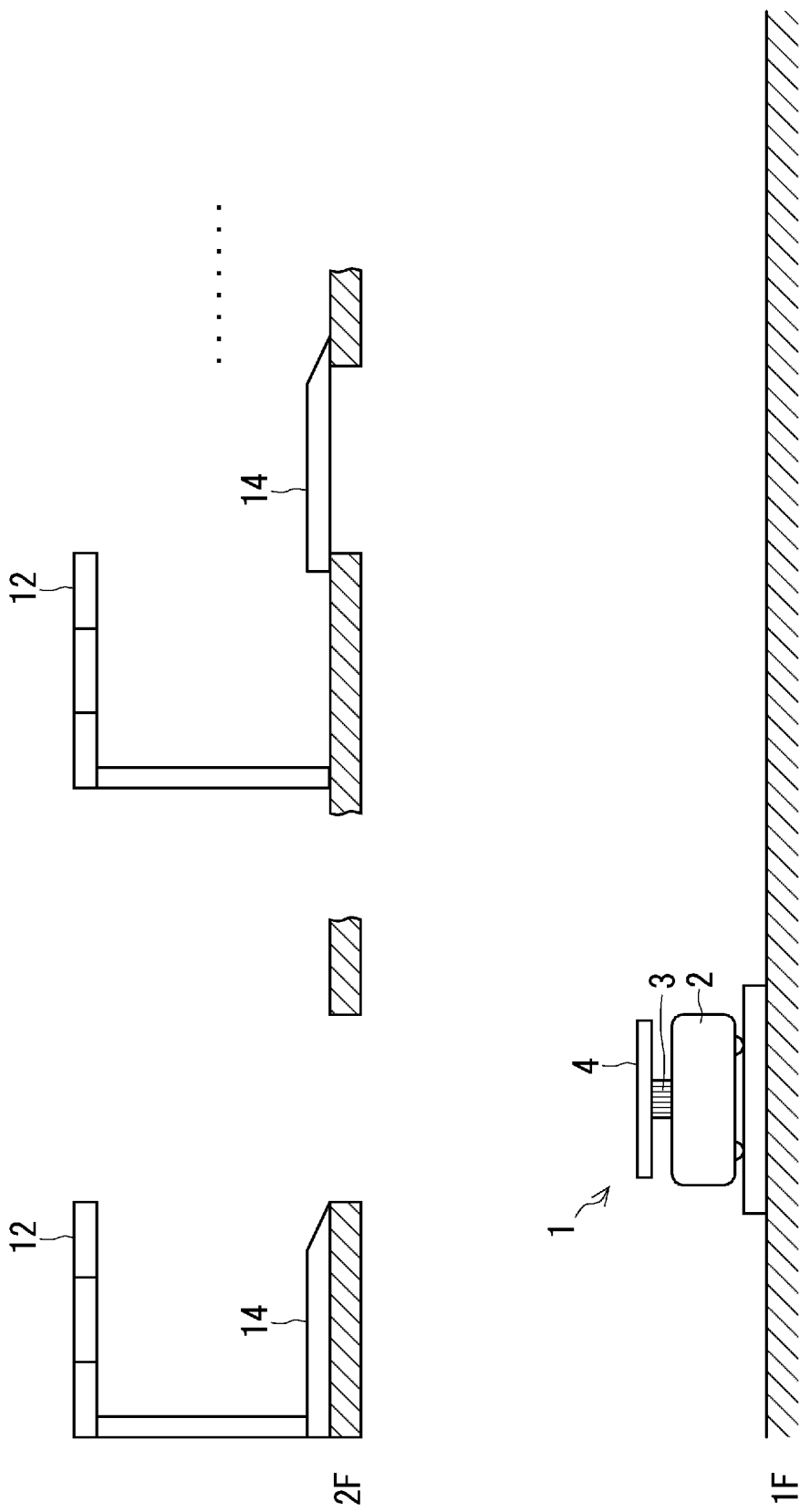
FIG. 27 shows a configuration in which a plurality of pairs of opening/closing floors and second engagement parts are provided on a second-floor surface.

Note that in the above description, a configuration in which a pair of the opening/closing floor 14 and the second engagement part 12 is provided in the second-floor surface is described. However, the present disclosure is not limited such a configuration. A configuration in which a plurality of pairs of opening/closing floors 14 and second engagement parts 12 may be provided in the second-floor surface may be adopted (FIG. 27). The moving body 1 selects one of the plurality of pairs of opening/closing floors 14 and second engagement parts 12, and moves up or down by using the selected opening/closing floor 14 and the second engagement part 12 as described above.

Figure 28:
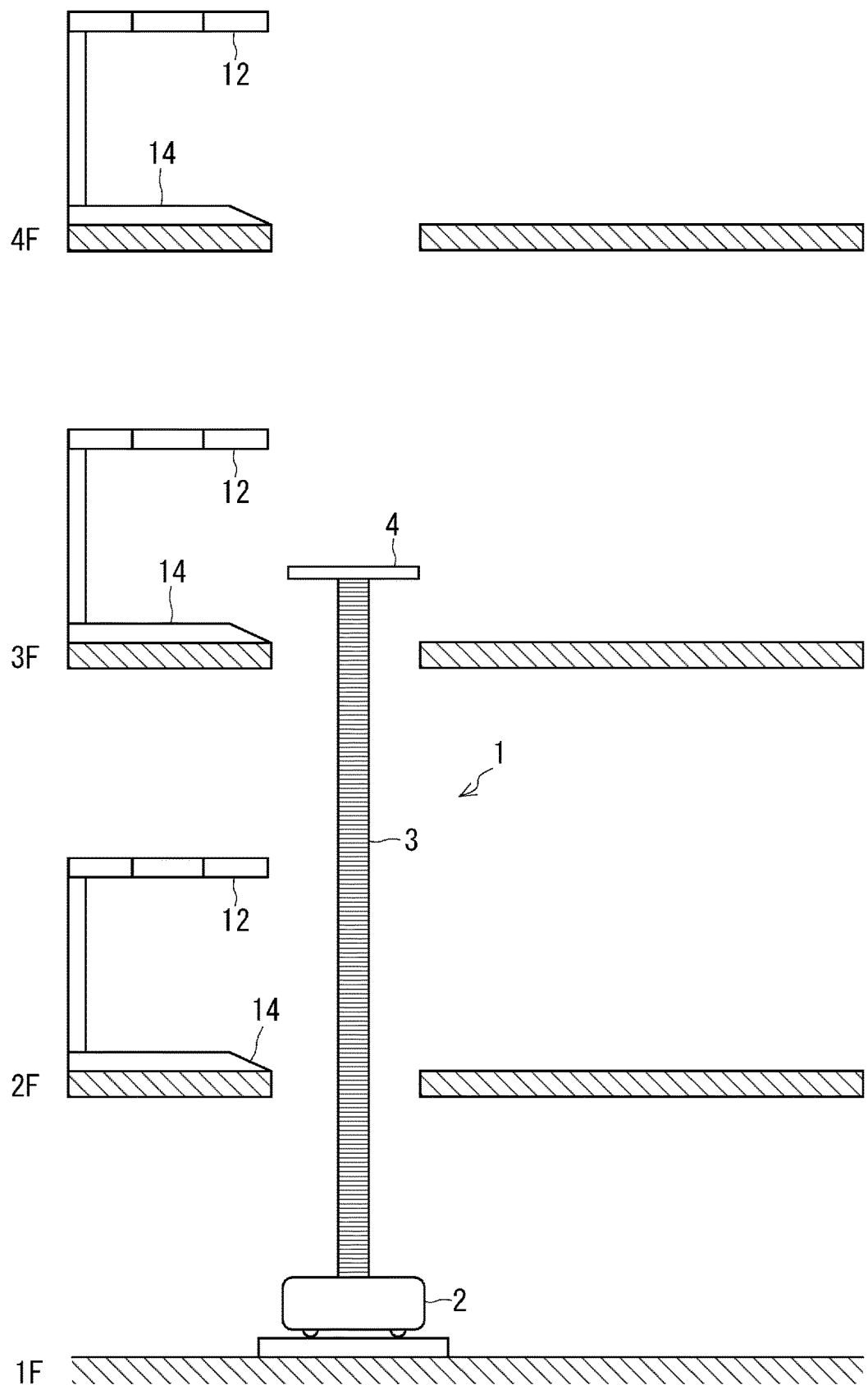
FIG. 28 shows a configuration in which a moving body moves up and down between a first floor and a third floor or a higher floor.

Further, in the above description, the moving body 1 is configured to move up and down between the first and second floors, but the present disclosure is not limited such a configuration. The moving body 1 may be configured to move up and down between the first floor and the third floor or a higher floor, or may be configured to move up and down between an arbitrary floor and another arbitrary floor. In such cases, for example, the through holes in all the floors are formed so that they are centered on one and the same axis. Further, an opening/closing floor 14 and a second engagement part 12 are provided for each of the through holes in all the floors (FIG. 28). The control unit 5 of the moving body 1 can move to a target floor by operating the opening/closing floor 14 and the second engagement part 12 on the target floor in a manner similar to the above-described manner.

For example, when the moving body 1 moves from the first floor to the third floor, the control unit 5 moves the moving body 1 to a predetermined position directly below the through hole in the second-floor surface by controlling the moving part 2.

When the control unit 5 of the moving body 1 has determined that the moving part 2 has moved to the predetermined position directly below the through hole, it transmits an opening signal to the floor sliding parts 15 on the second and third floors. The floor sliding parts 15 on the second and third floors slide the opening/closing floors 14 on the second and third floors in response to the opening signal sent from the control unit 5 and thereby open the through holes in the floor surfaces on the second and third floors.

When the control unit 5 has determined that the through holes in the floor surfaces on the second and third floors have become the opened state, it moves the first engagement part 4 to the height position of the second engagement part 12 of the third-floor surface, i.e., to the target height position by expanding the expansion/contraction part 3.

When the control unit 5 has determined that the first engagement part 4 has moved to the height position of the second engagement part 12 in the third-floor surface, it transmits an engagement signal to the engagement sliding part 13 on the third floor. The engagement sliding part 13 on the third floor slides the second engagement part 12 on the third floor in response to the engagement signal transmitted from the control unit 5 and thereby engages it with the first engagement part 4.

When the control unit 5 has determined that the second engagement part 12 on the third floor has engaged with the first engagement part 4, it pulls up (i.e., lifts) the moving part 2 to a position that is higher than the third-floor surface, i.e., the target height position by a predetermined length by contracting (i.e., shortening) the expansion/contraction part 3.

When the control unit 5 has determined that the moving part 2 has been pulled up (i.e., lifted) to the position higher than the third-floor surface by the predetermined length, it transmits a closing signal to the floor sliding parts 15 on the second and third floors. The floor sliding parts 15 slide the opening/closing floors 14 on the second and third floors in response to the closing signal sent from the control unit 5 and thereby close the through holes in the floor surfaces on the second and third floors.

When the control unit 5 has determined that the opening/closing floors 14 on the second and third floors have become the closed state, it lowers the moving part 2 onto the opening/closing floor 14 on the third floor by expanding the expansion/contraction part 3.

When the control unit 5 has determined that the moving part 2 has been lowered onto the opening/closing floor 14 on the third floor, it transmits a disengagement signal to the engagement sliding part 13. The engagement sliding part 13 slides the second engagement part 12 on the third floor in response to the disengagement signal transmitted from the control unit 5 and thereby disengages it from the first engagement part 4.

When the control unit 5 has determined that the first engagement part 4 has been disengaged from the second engagement part 12 on the third floor, it contracts (i.e., shortens) the expansion/contraction part 3 into the contracted state.

When the control unit 5 has determined that the expansion/contraction part 3 has become the contracted state, it moves the moving body 1 to a desired position on the third floor by controlling the moving part 2.

Several embodiments according to the present disclosure have been explained above. However, these embodiments are shown as examples but are not shown to limit the scope of the disclosure. These novel embodiments can be implemented in various forms. Further, their components/structures may be omitted, replaced, or modified without departing from the scope and spirit of the disclosure. These embodiments and their modifications are included in the scope and the spirit of the disclosure, and included in the scope equivalent to the invention specified in the claims.

In the present disclosure, for example, the processes shown in FIG. 5 can be implemented by having a CPU execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer through a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A moving body comprising:
    a movable moving part;
    an expansion/contraction part disposed in the moving part and configured to expand and contract in a vertical direction;
    a first engagement part disposed at a tip of the expansion/contraction part and configured to engage with a member located in a surrounding environment; and
    a control unit configured to control the moving part and the expansion/contraction part, wherein
    the control unit moves the moving part to a target height position by engaging the first engagement part with a member located at the target height position and then expanding or contracting the expansion/contraction part.

2. The moving body according to claim 1, further comprising a fixing part configured to fix the moving part when the expansion/contraction part is expanded or contracted.

3. The moving body according to claim 1, wherein when the control unit determines that the first engagement part has engaged with the member located at the target height position, the control unit performs control so as to move the moving part to the target height position by expanding or contracting the expansion/contraction part.

4. The moving body according to claim 1, wherein
    the expansion/contraction part comprises a first belt comprising a first engagement mechanism and a second belt comprising a second engagement mechanism capable of engaging with and being disengaged from the first engagement mechanism, and
    the expansion/contraction part forms a columnar structure by spirally winding the first and second engagement mechanisms of the first and second belts around one and the same axis in a mutually overlapping state.

5. A station comprising:
    at least one second engagement part configured to engage with the first engagement part of the moving body according to claim 1; and
    at least one opening/closing floor disposed below the second engagement part and configured to open or close a through hole formed in a floor surface, the through hole being formed to enable the moving body to pass through the floor surface when the moving body moves up or down.

6. A movement system comprising the station according to claim 5, and the moving body configured to move up and down in the station.

7. The movement system according to claim 6, further comprising an object detection unit configured to detect an object located at a predetermined position below the through hole, wherein
    the control unit moves the moving part to the predetermined position and expands the expansion/contraction part when the object detection unit does not detect any object.

8. The movement system according to claim 6, wherein the control unit performs control so as to expand or contract the expansion/contraction part, to thereby engage the first engagement part with the second engagement part located at the target height position.

9. The movement system according to claim 8, wherein the control unit performs control so as to, after engaging the first engagement part with the second engagement part, move the moving part to the target height position through the through hole by expanding or contracting the expansion/contraction part, close the opening/closing floor, and lower the moving part onto the opening/closing floor.

10. A method for moving a moving body,
    the moving body comprising:
    a movable moving part;
    an expansion/contraction part disposed in the moving part and configured to expand and contract in a vertical direction; and
    a first engagement part disposed at a tip of the expansion/contraction part and configured to engage with a member located in a surrounding environment,
    the method comprising:
    moving the moving part to a target height position by engaging the first engagement part with a member located at the target height position and then expanding or contracting the expansion/contraction part.

11. A non-transitory computer readable medium storing a program for moving a moving body,
the moving body comprising:
a movable moving part;
an expansion/contraction part disposed in the moving part and configured to expand and contract in a vertical direction; and
a first engagement part disposed at a tip of the expansion/contraction part and configured to engage with a member located in a surrounding environment,
for causing a computer to perform:
a step of moving the moving part to a target height position by engaging the first engagement part with a member located at the target height position and then expanding or contracting the expansion/contraction part.

* * * * *